United States Patent
Park et al.

(10) Patent No.: US 10,721,640 B2
(45) Date of Patent: Jul. 21, 2020

(54) METHOD FOR PERFORMING MEASUREMENT IN WIRELESS COMMUNICATION SYSTEM AND APPARATUS FOR SAME

(71) Applicant: LG ELECTRONICS INC., Seoul (KR)

(72) Inventors: Jonghyun Park, Seoul (KR); Yunjung Yi, Seoul (KR); Hyangsun You, Seoul (KR)

(73) Assignee: LG ELECTRONICS INC., Seoul (KR)

(*) Notice: Subject to any disclaimer, the term of this patent is extended or adjusted under 35 U.S.C. 154(b) by 140 days.

(21) Appl. No.: 15/329,218

(22) PCT Filed: Aug. 7, 2015

(86) PCT No.: PCT/KR2015/008313
§ 371 (c)(1),
(2) Date: Jan. 25, 2017

(87) PCT Pub. No.: WO2016/021993
PCT Pub. Date: Feb. 11, 2016

(65) Prior Publication Data
US 2017/0215097 A1    Jul. 27, 2017

Related U.S. Application Data

(60) Provisional application No. 62/034,968, filed on Aug. 8, 2014.

(51) Int. Cl.
*H04W 24/08* (2009.01)
*H04B 17/318* (2015.01)
(Continued)

(52) U.S. Cl.
CPC .......... *H04W 24/08* (2013.01); *H04B 17/318* (2015.01); *H04L 5/0048* (2013.01);
(Continued)

(58) Field of Classification Search
CPC ..... H04W 24/02; H04W 24/08; H04W 8/005; H04W 52/343; H04W 48/16; H04W 84/045; H04B 17/318; H04L 5/0048
See application file for complete search history.

(56) References Cited

U.S. PATENT DOCUMENTS

2011/0268101 A1    11/2011    Wang et al.
2011/0319025 A1*   12/2011    Siomina ............... H04B 7/024
                                                                455/63.1
(Continued)

FOREIGN PATENT DOCUMENTS

CN    103392299    11/2013

OTHER PUBLICATIONS

Alcatel-Lucent, "Neighbor Cells List for Restricted Patterns," 3rd Generation Partnership Project (3GPP), 3GPP Draft, R4-114060, Aug. 22-26, 2011 (Year: 2011).*

(Continued)

*Primary Examiner* — Robert C Scheibel
(74) *Attorney, Agent, or Firm* — Lee Hong Degerman Kang Waimey

(57) ABSTRACT

A method for performing a measurement in a wireless communication system and an apparatus for the same are disclosed. Particularly, a method by which a terminal performs a measurement in a wireless communication system comprises the steps of: receiving, by the terminal, a discovery signal; and measuring, by the terminal, reference signal received power (RSRP) and/or reference signal received quality (RSRQ) on the basis of the discovery signal, wherein the number of antenna ports of a cell-specific reference (Continued)

(a)

(b)

signal (CRS) cannot be applied to the discovery signal-based measurement.

14 Claims, 22 Drawing Sheets

(51) Int. Cl.
| | |
|---|---|
| H04L 5/00 | (2006.01) |
| H04W 52/34 | (2009.01) |
| H04W 24/02 | (2009.01) |
| H04W 8/00 | (2009.01) |
| H04W 84/04 | (2009.01) |
| H04B 7/00 | (2006.01) |
| H04W 48/16 | (2009.01) |

(52) U.S. Cl.
CPC ........... *H04W 8/005* (2013.01); *H04W 24/02* (2013.01); *H04W 52/343* (2013.01); *H04B 7/00* (2013.01); *H04L 5/005* (2013.01); *H04L 5/0035* (2013.01); *H04W 48/16* (2013.01); *H04W 84/045* (2013.01)

(56) References Cited

U.S. PATENT DOCUMENTS

| | | | | |
|---|---|---|---|---|
| 2012/0122472 | A1* | 5/2012 | Krishnamurthy | H04L 5/0053 455/456.1 |
| 2012/0213109 | A1* | 8/2012 | Xu | H04B 7/024 370/252 |
| 2015/0131553 | A1* | 5/2015 | Centonza | H04W 24/10 370/329 |
| 2015/0189574 | A1* | 7/2015 | Ng | H04W 24/08 370/252 |
| 2015/0223245 | A1* | 8/2015 | Cheng | H04W 48/16 370/329 |
| 2017/0195028 | A1* | 7/2017 | Shimezawa | H04W 24/10 |

OTHER PUBLICATIONS

3GPP, TS GRAN E-UTRA RRC Protocol Specification Release 10, TS 36.331 v10.12.0, Dec. 2013 (Year: 2013).*
State Intellectual Property Office of the People's Republic of China Application Serial No. 201580048153.6, Office Action dated Jan. 2, 2018, 15 pages.
PCT International Application No. PCT/KR2015/008313, International Search Report dated Jan. 29, 2016, 2 pages.
CATT, "Evaluation on small cell discovery signal", R1-141991, 3GPP TSG RAN WG1 Meeting #77, May 2014, 4pages.
Huawei, "RRM measurement procedures with DRS", R1-141917, 3GPP TSG RAN WG1 Meeting #77, May 2014, 6 pages.
ETRI, "Detailed design of Discovery signal(s)", R1-142209, 3GPP TSG RAN WG1 Meeting #77, May 2014, 5 pages.
LG Electonics, "DRS-based measurements with network assistance", R1-142138, 3GPP TSG RAN WG1 Meeting #77, May 2014, 5 pages.
Korean Intellectual Property Office Application No. 10-2017-7003255, Office Action dated Sep. 4, 2018, 4 pages.
Fiberhome, "Discussion on RSSI definition for DRS based RRM measurement", 3GPP TSG RAN WG1 Meeting #177, R1-142285, May 2014, 2 pages.
Mediatek, "On discovery signal based RRM measurements", 3GPP TSG RAN WG1 Meeting #77, R1-142301, May 2014, 5 pages.

* cited by examiner

【FIG. 1】
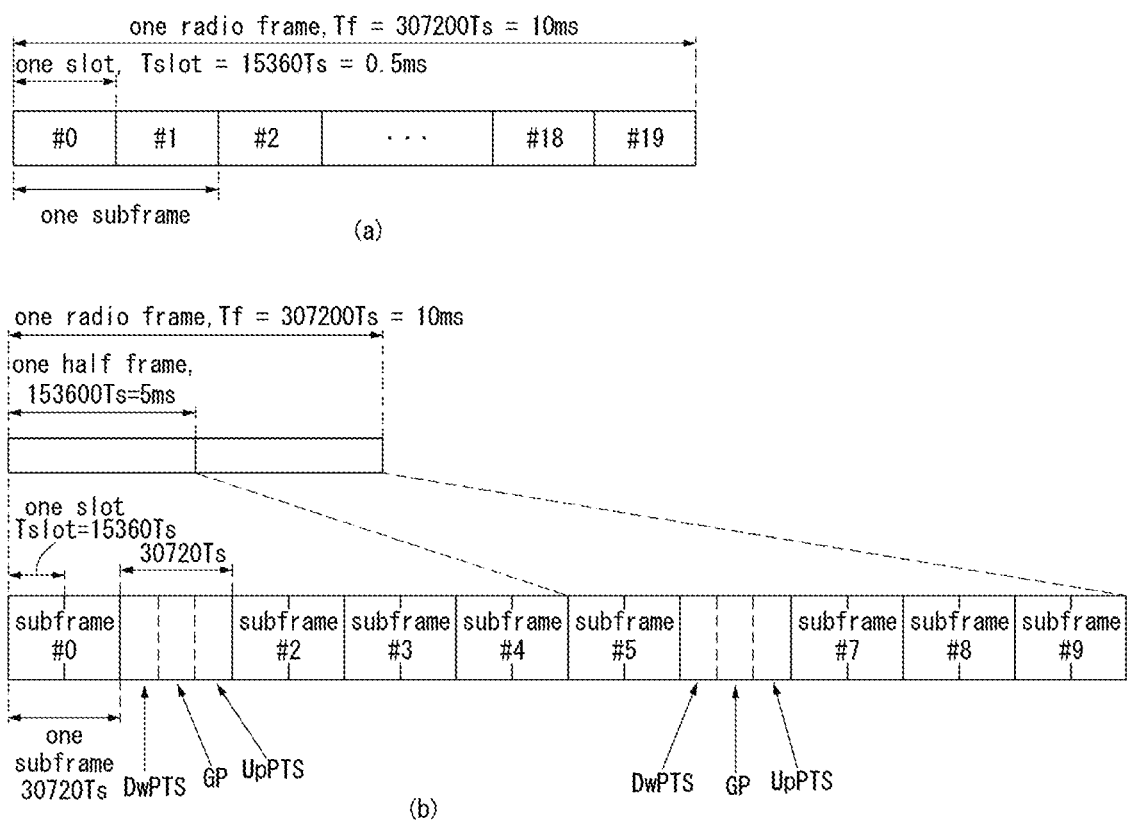

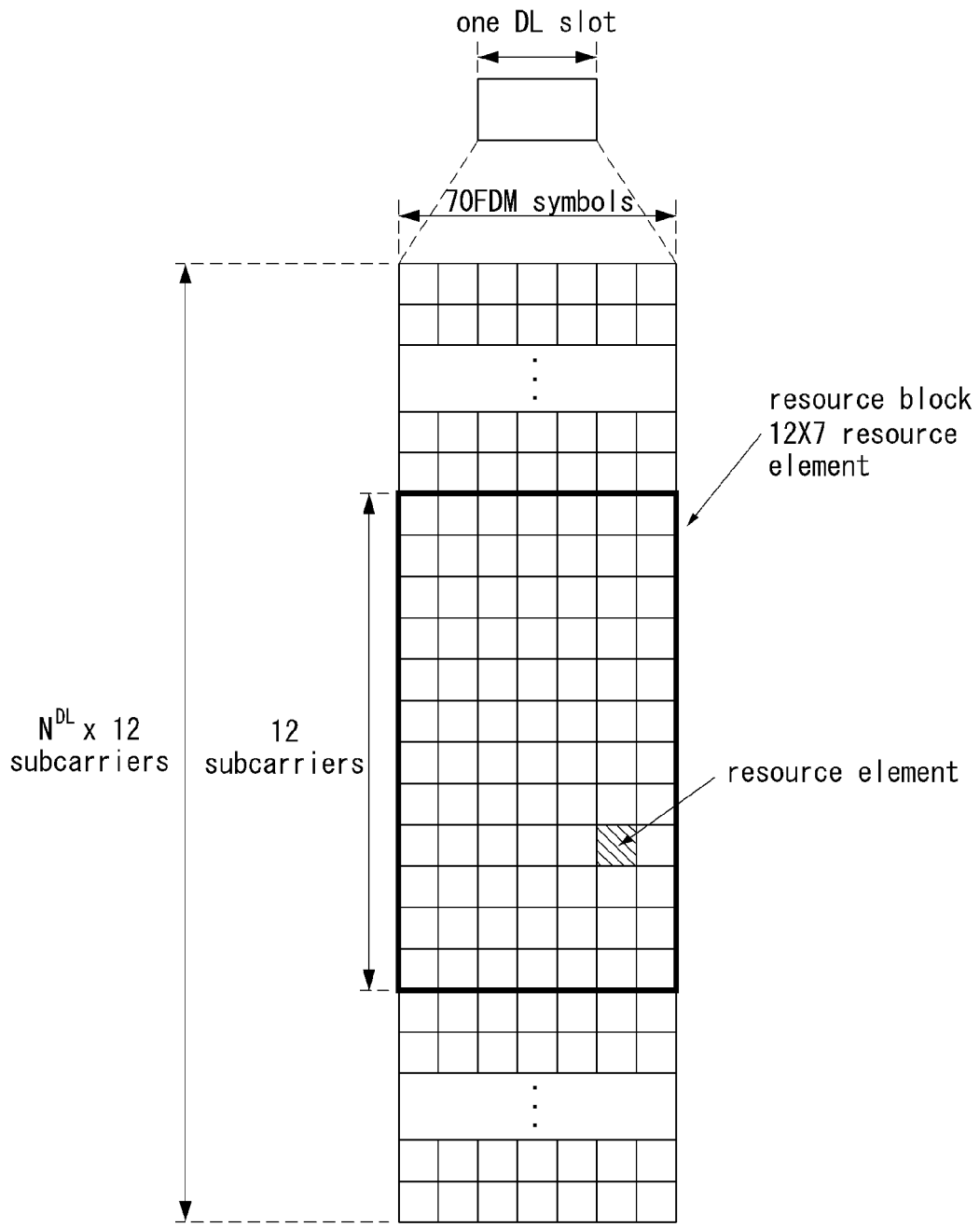
[FIG. 2]

[FIG. 3]
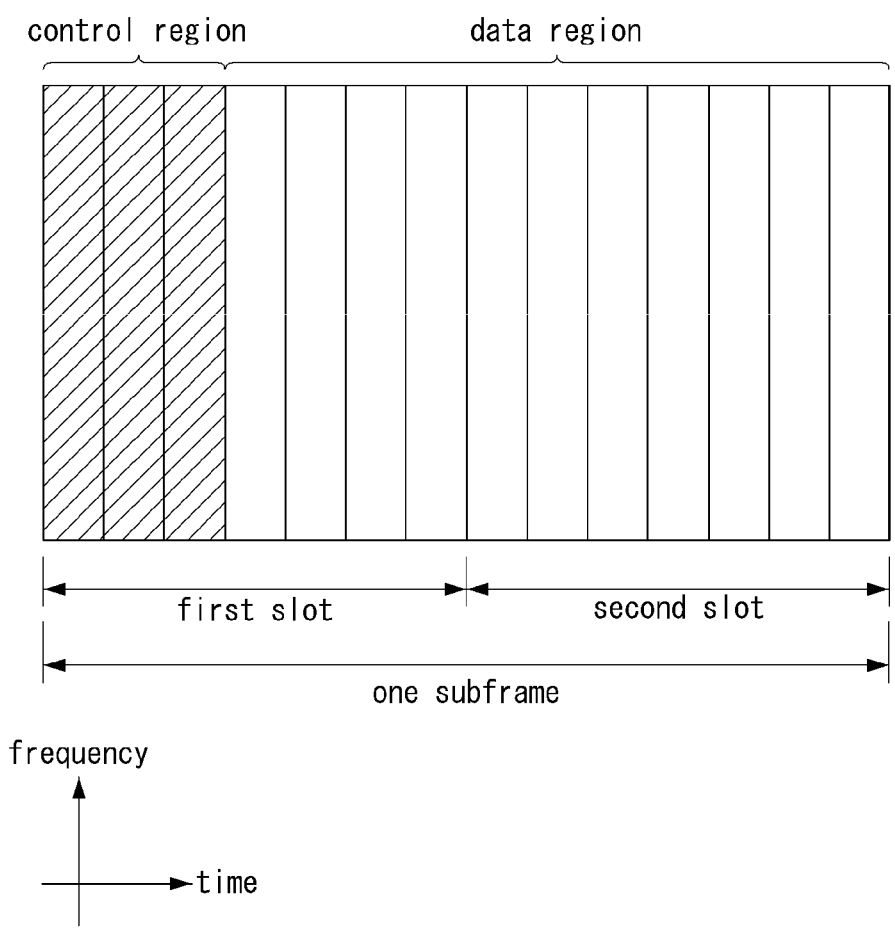

[FIG. 4]
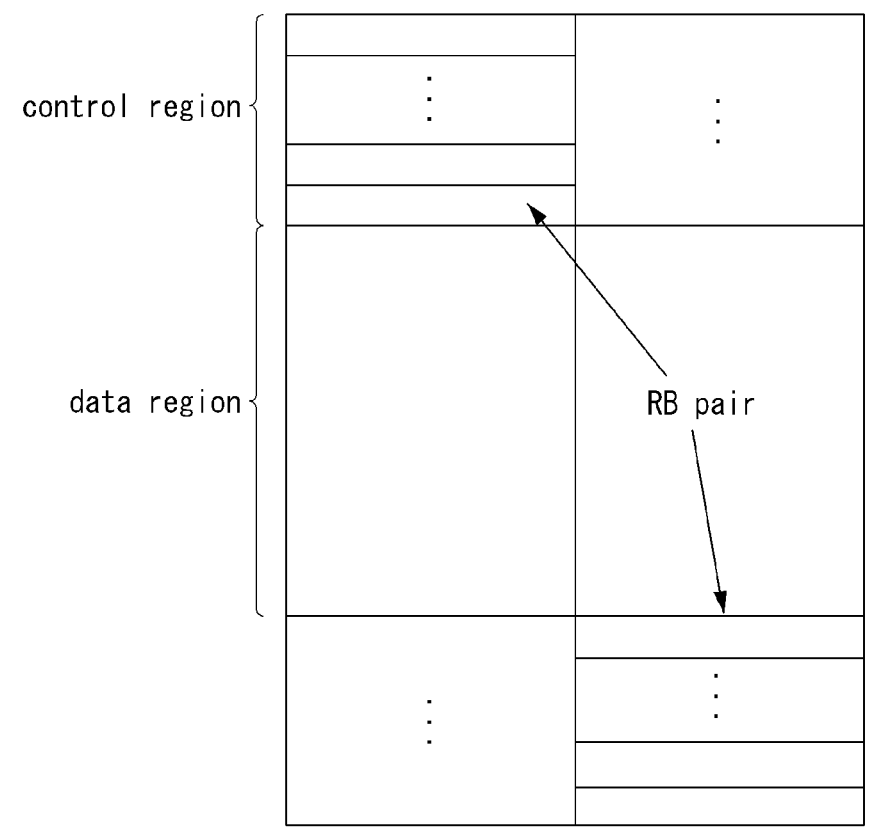

[FIG. 5]
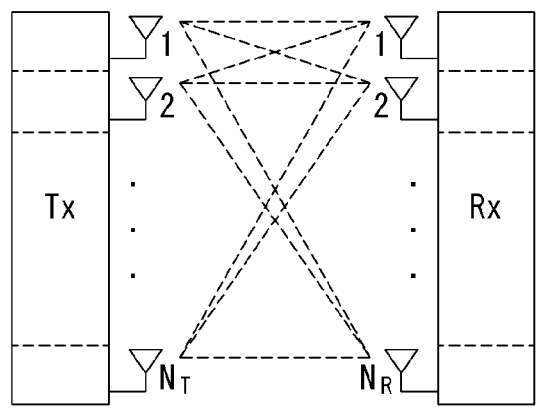
[FIG. 6]
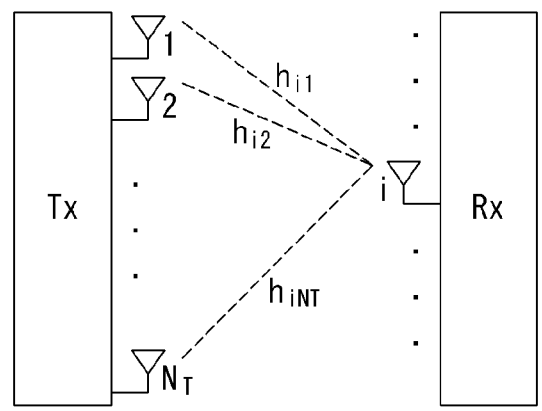

【FIG. 7】
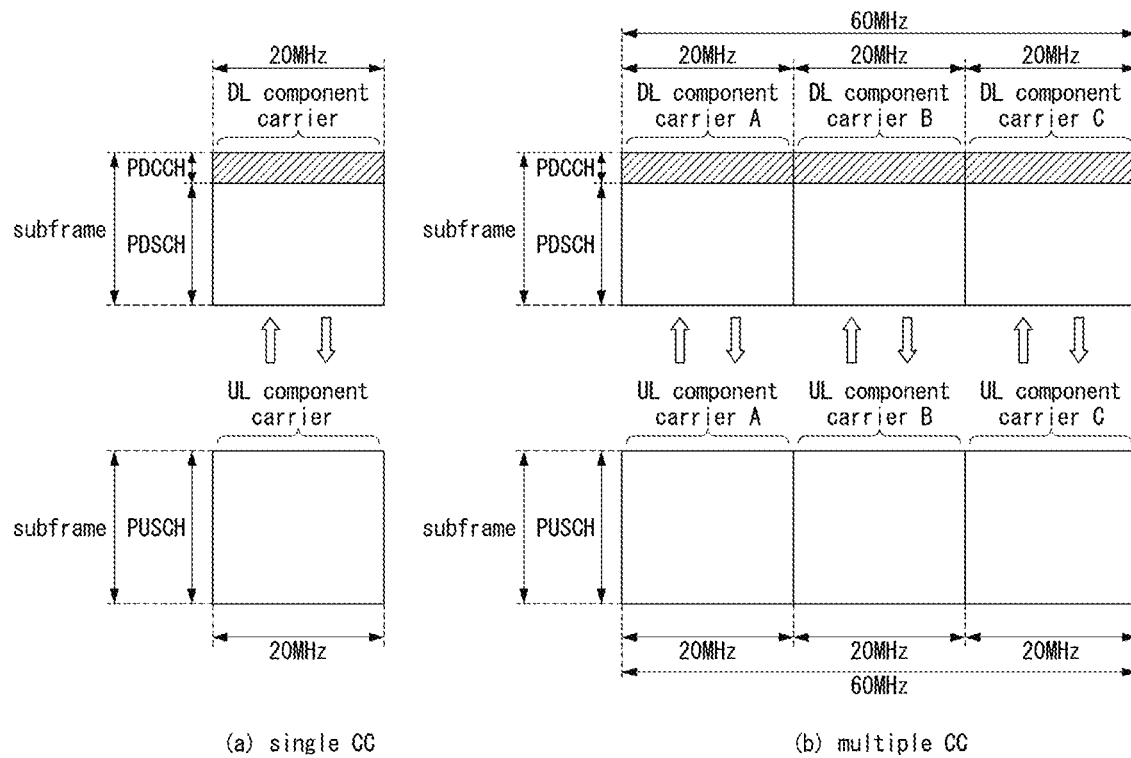

[FIG. 8]
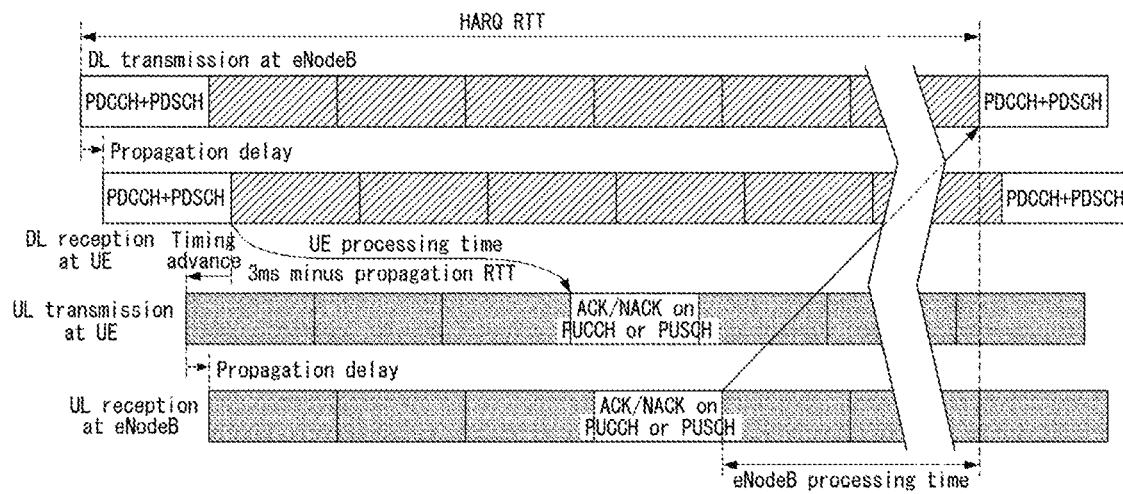

[FIG. 9]
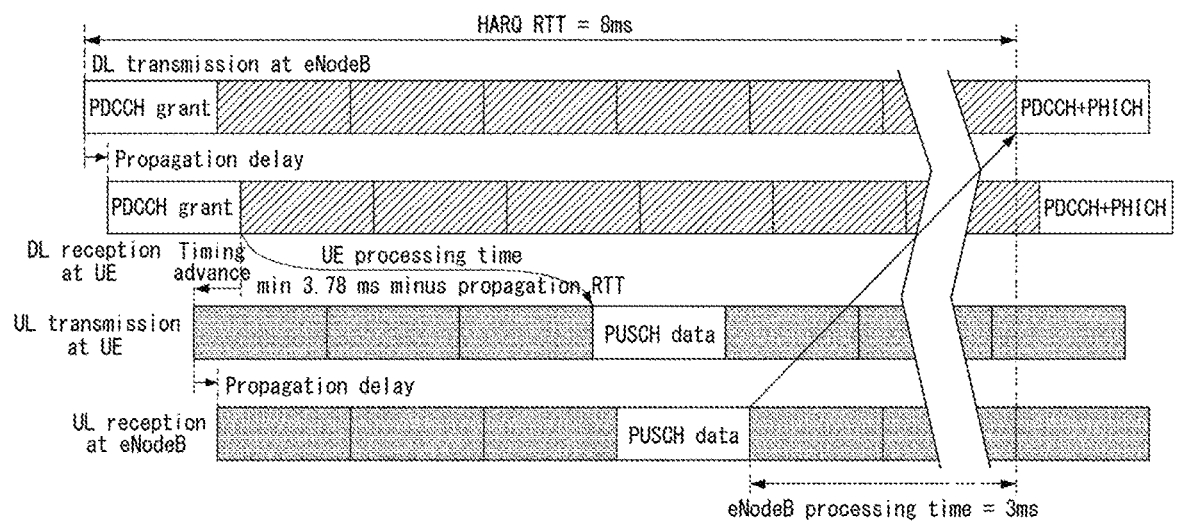

[FIG. 10]
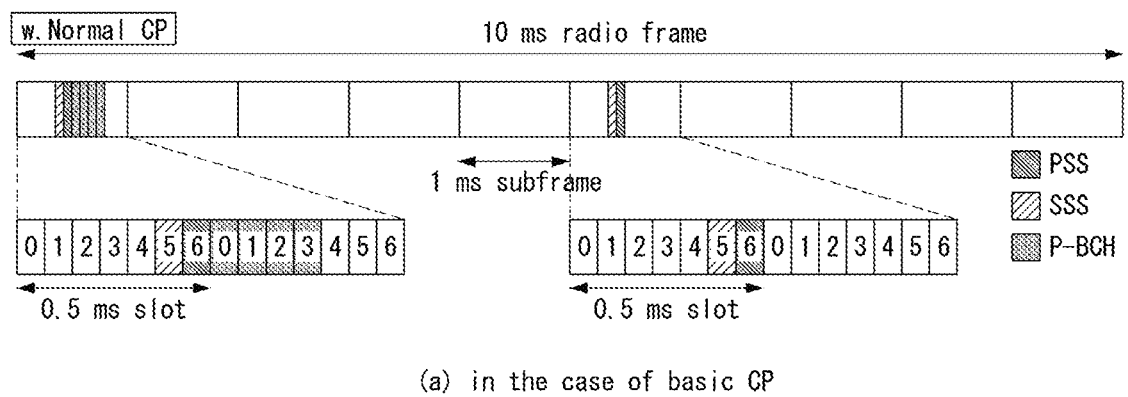
(a) in the case of basic CP
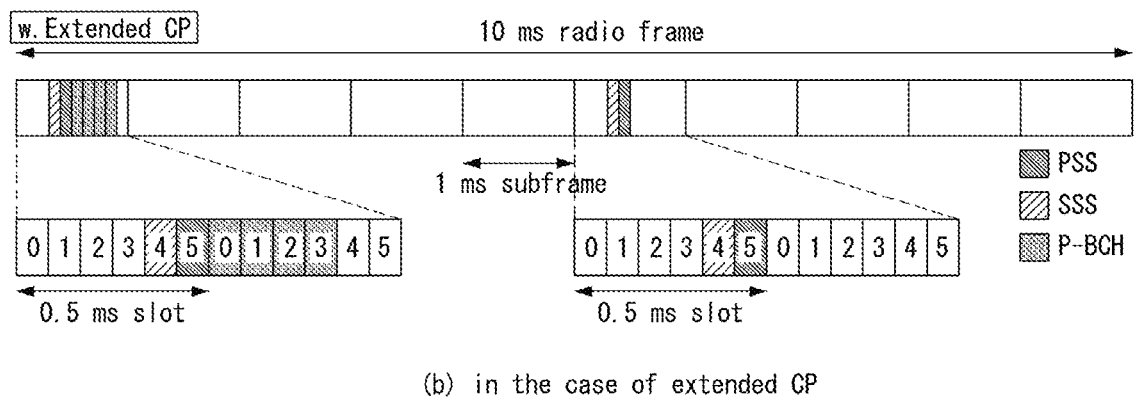
(b) in the case of extended CP

[FIG. 11]
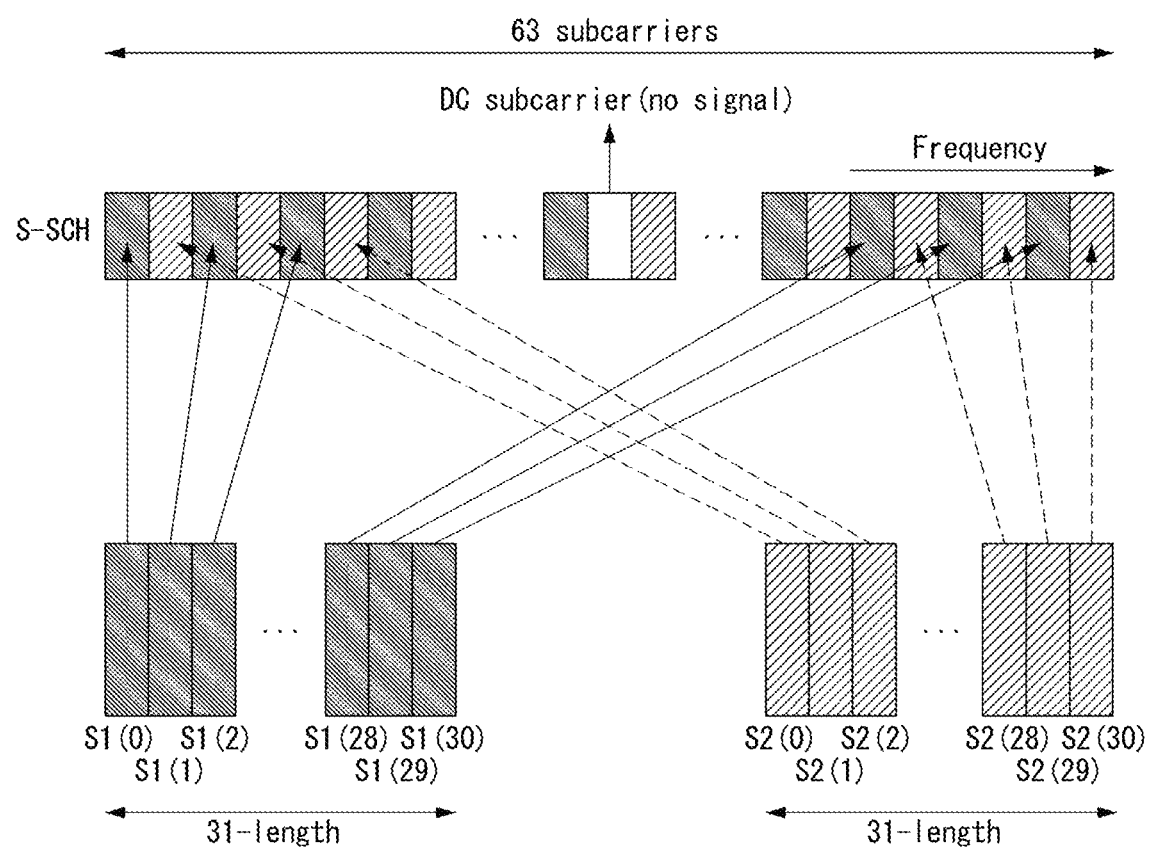

[FIG. 12]
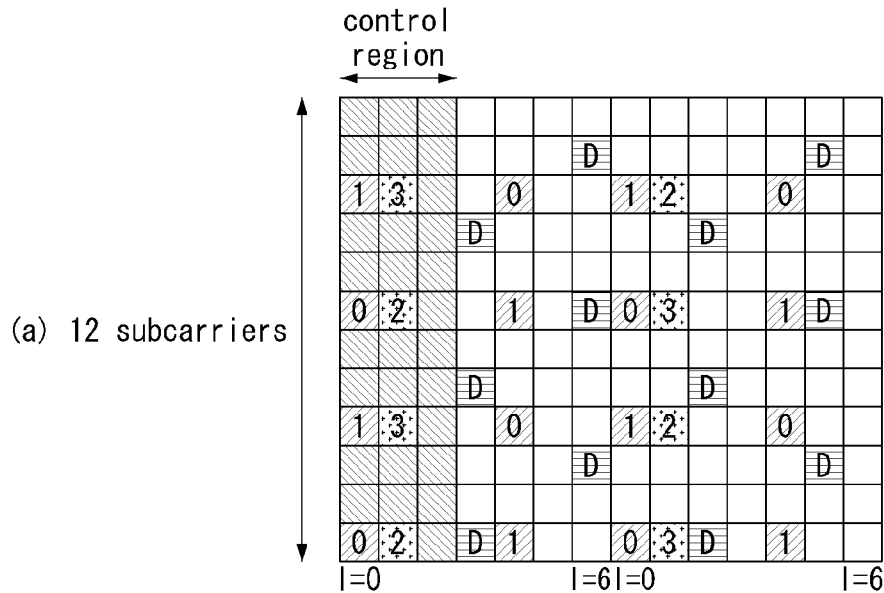
(a) 12 subcarriers
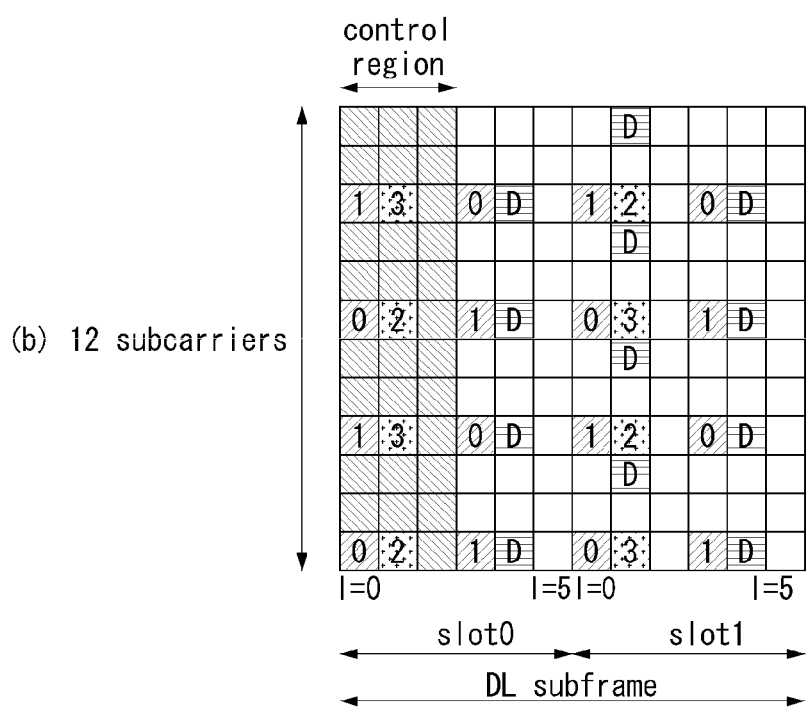
(b) 12 subcarriers

[FIG. 13]
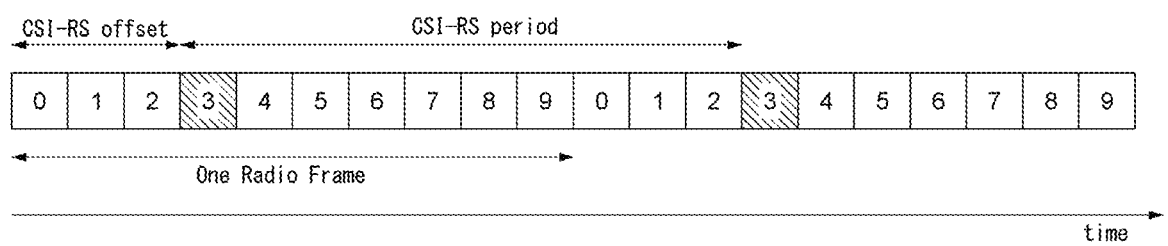

[FIG. 14]
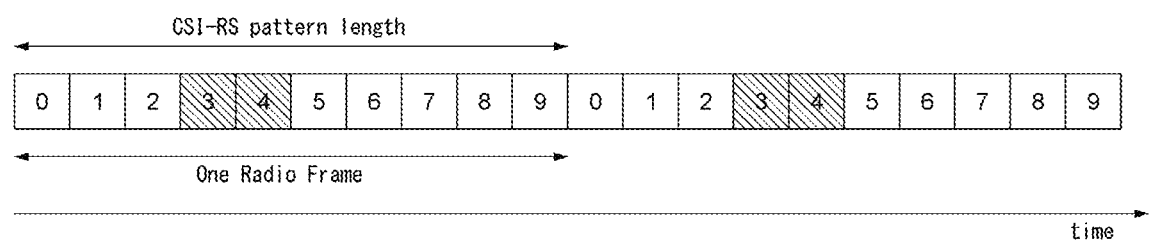

[FIG. 15]
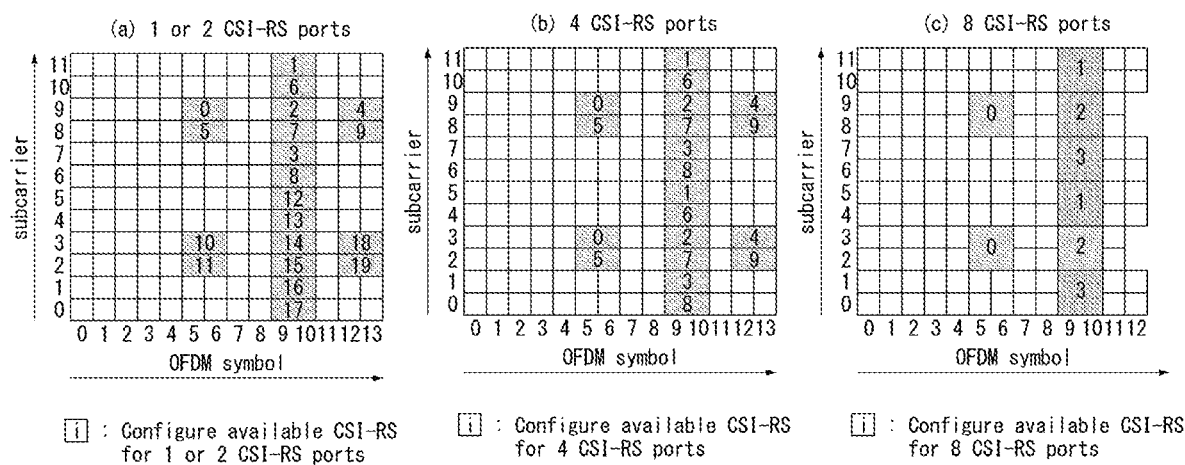

[FIG. 16]
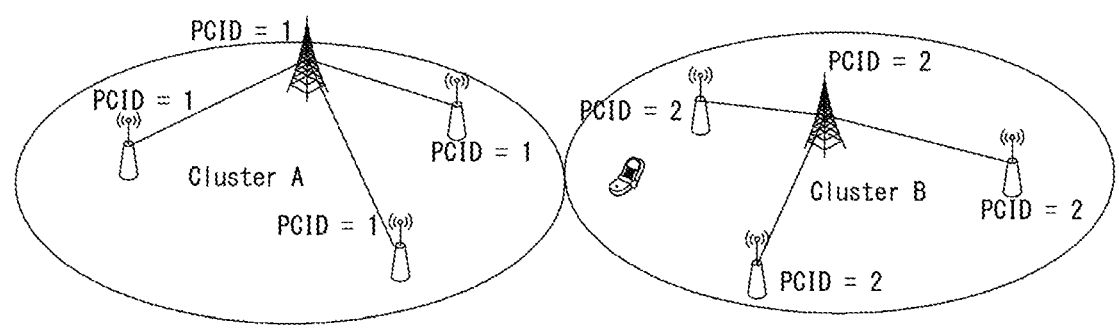

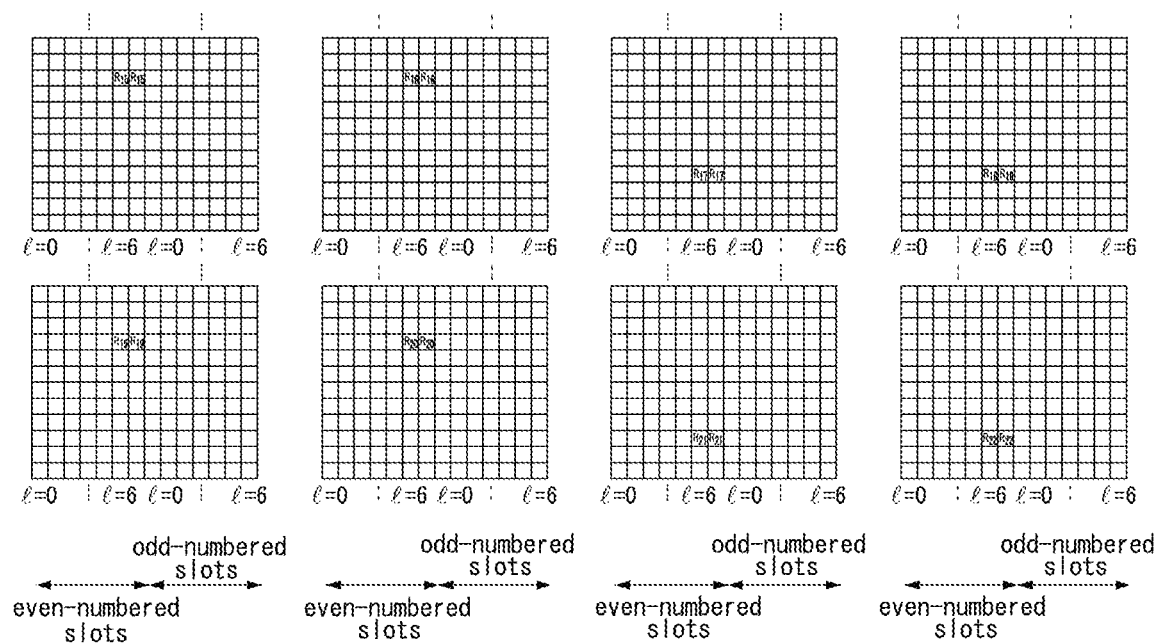
[FIG. 17]

[FIG. 18]
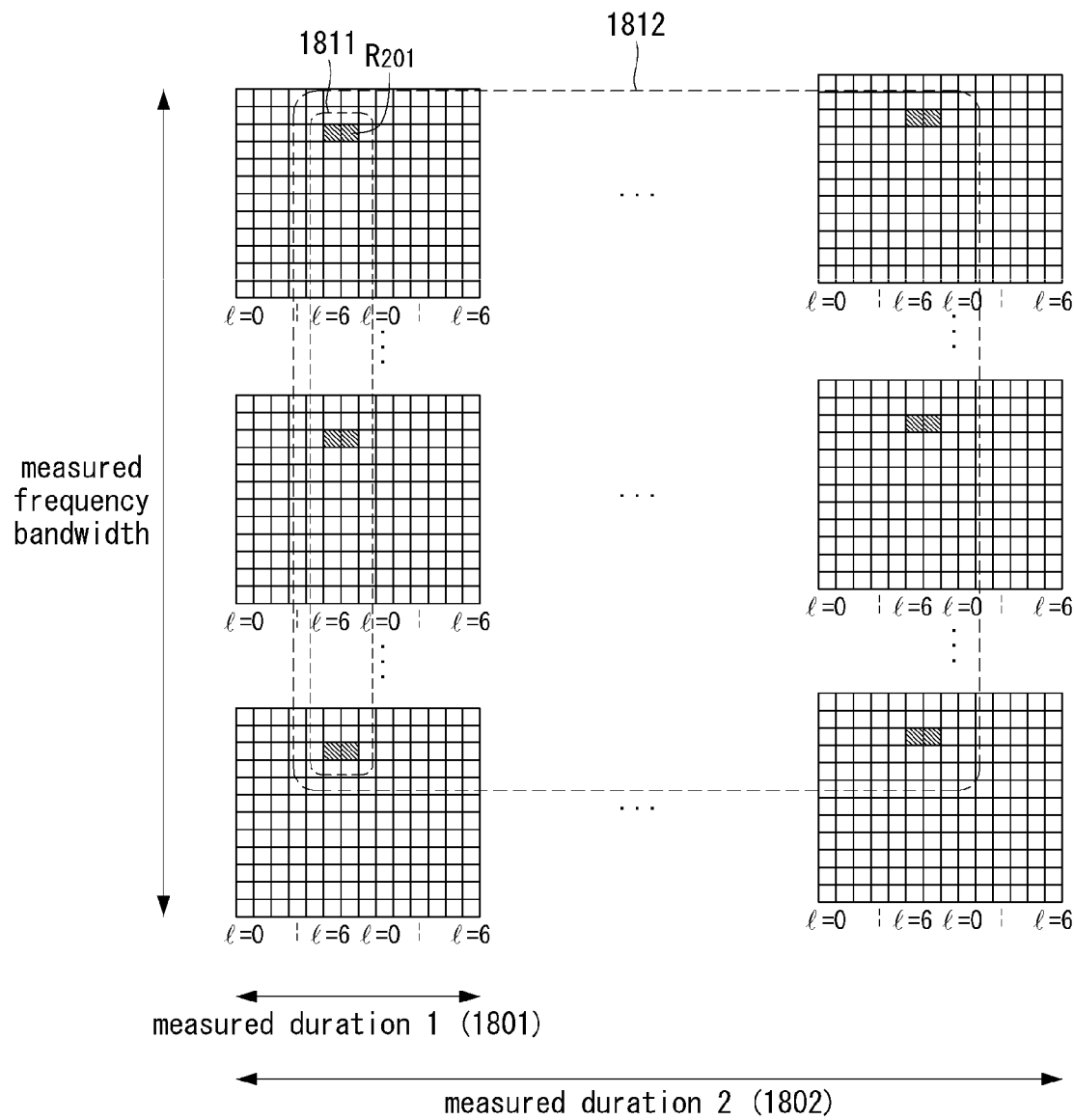

[FIG. 19]
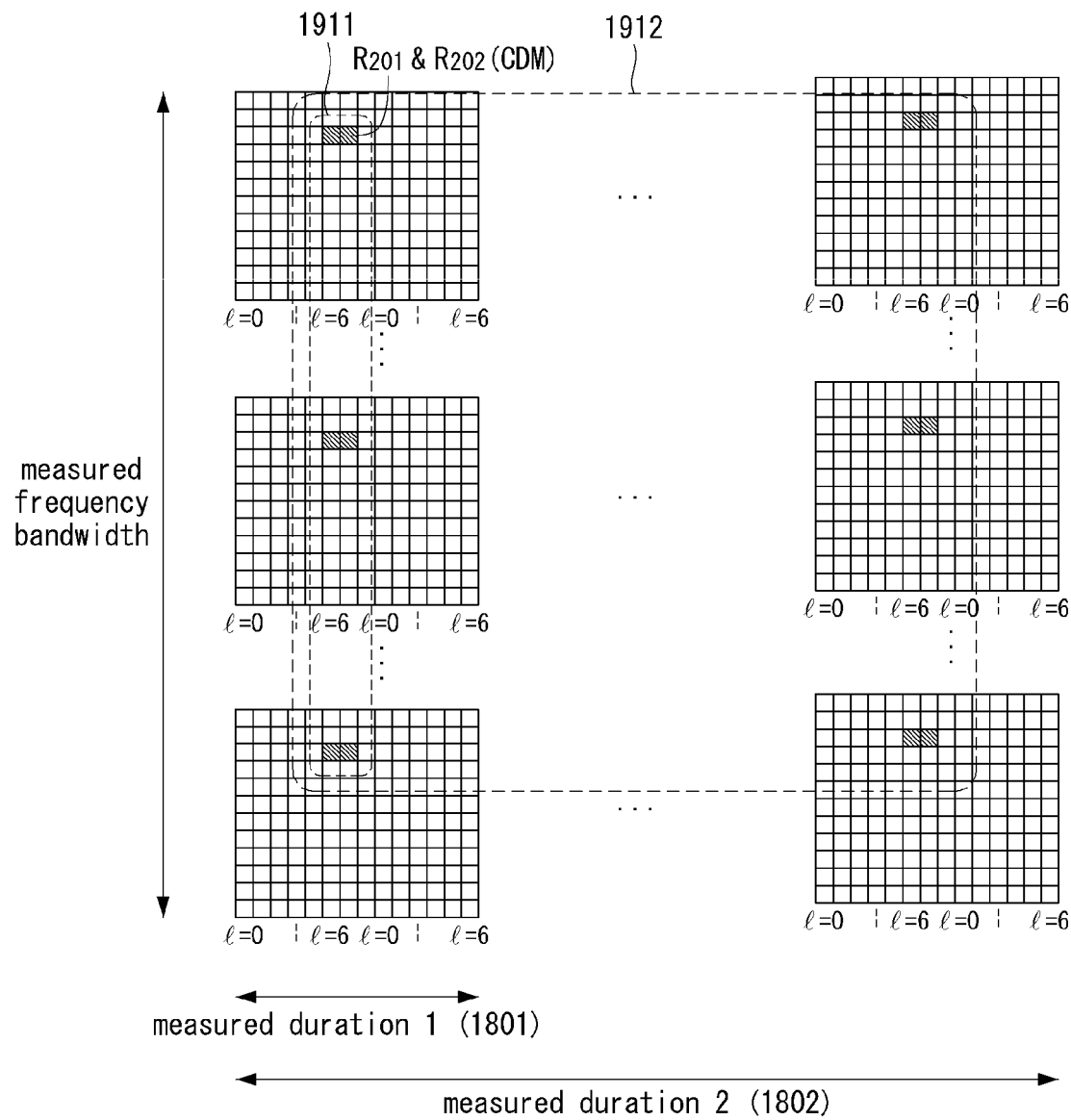

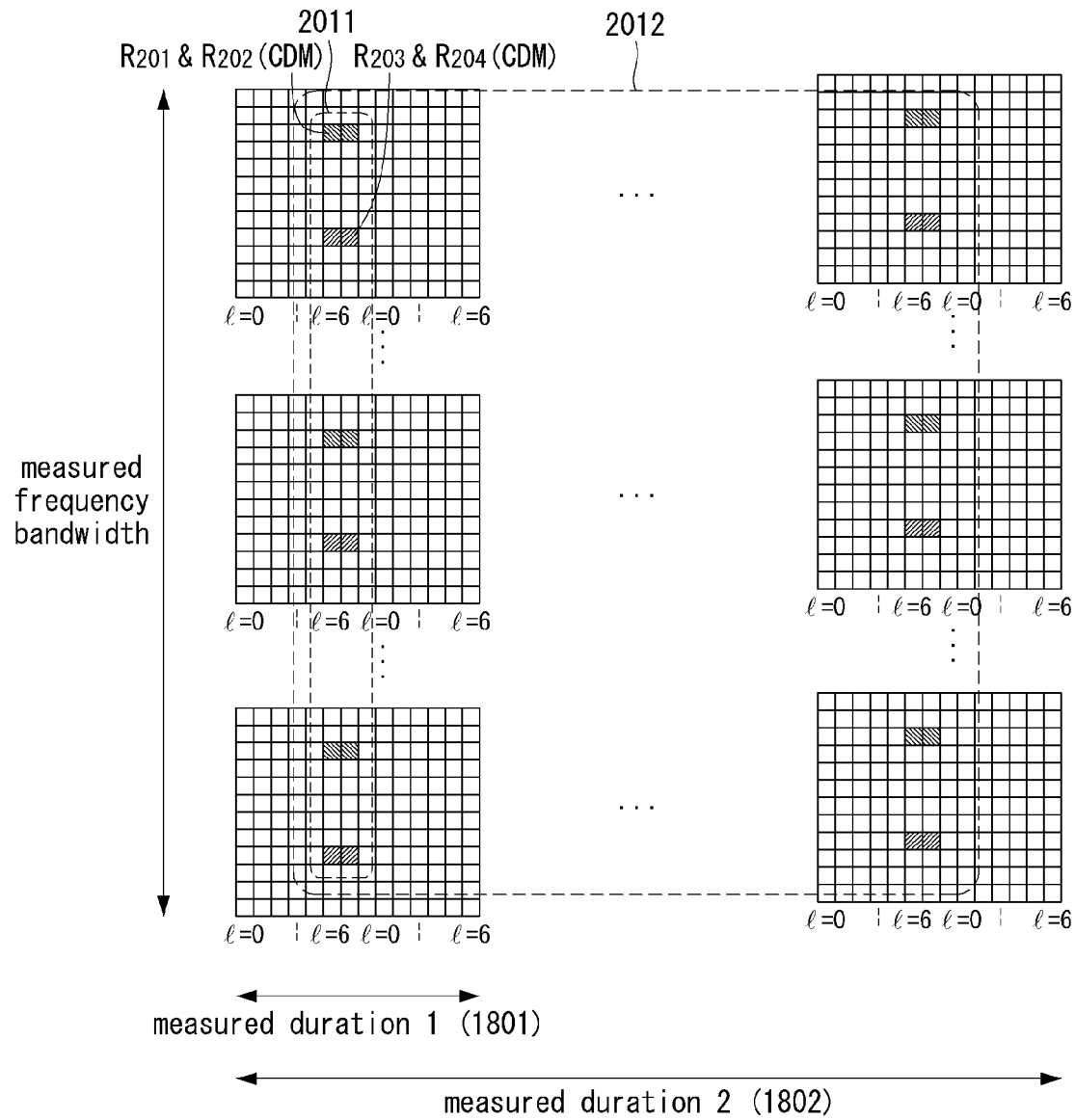
[FIG. 20]

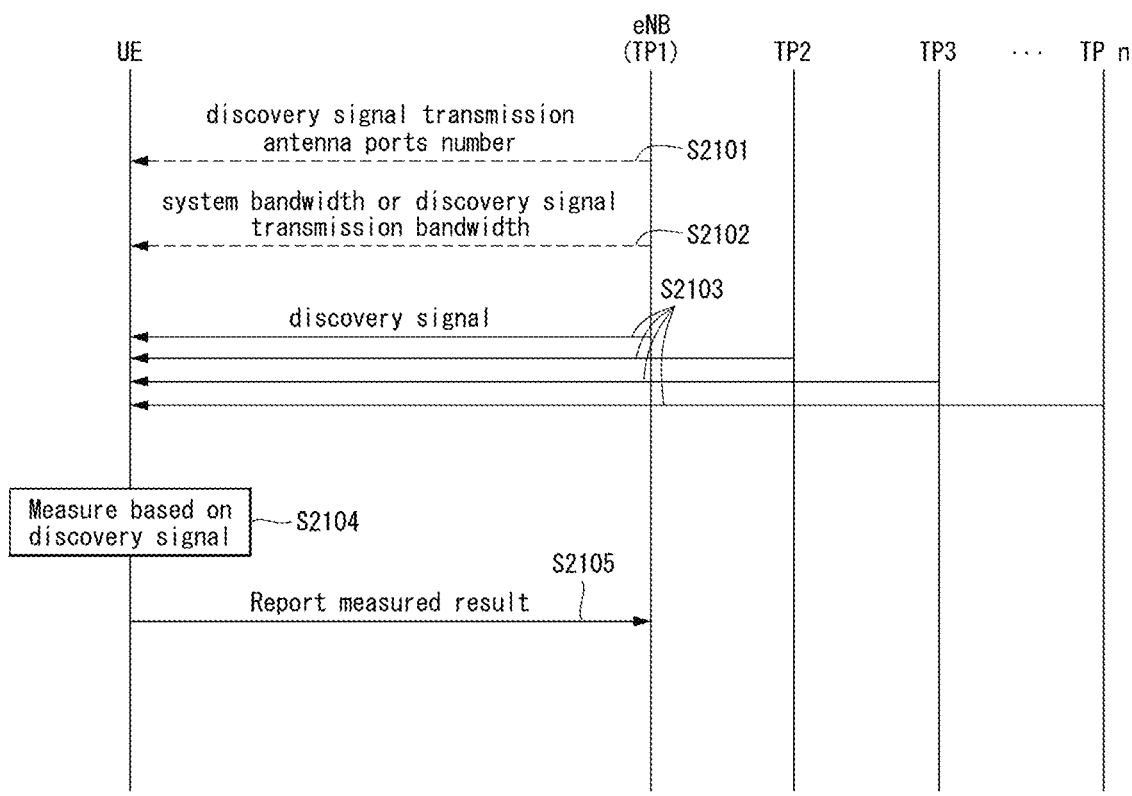
[FIG. 21]

[FIG. 22]
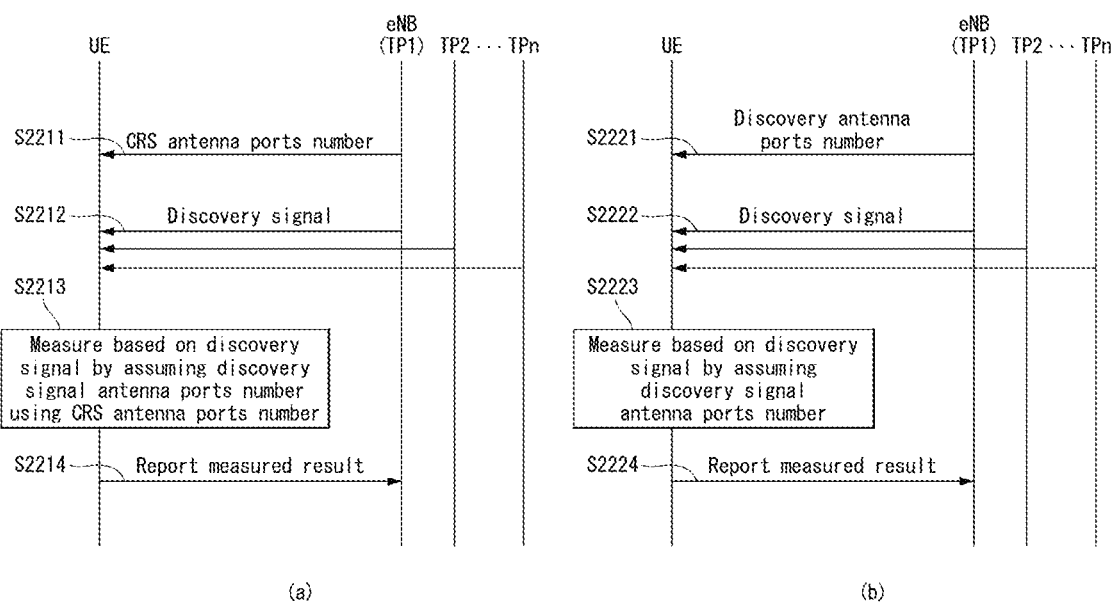

[FIG. 23]
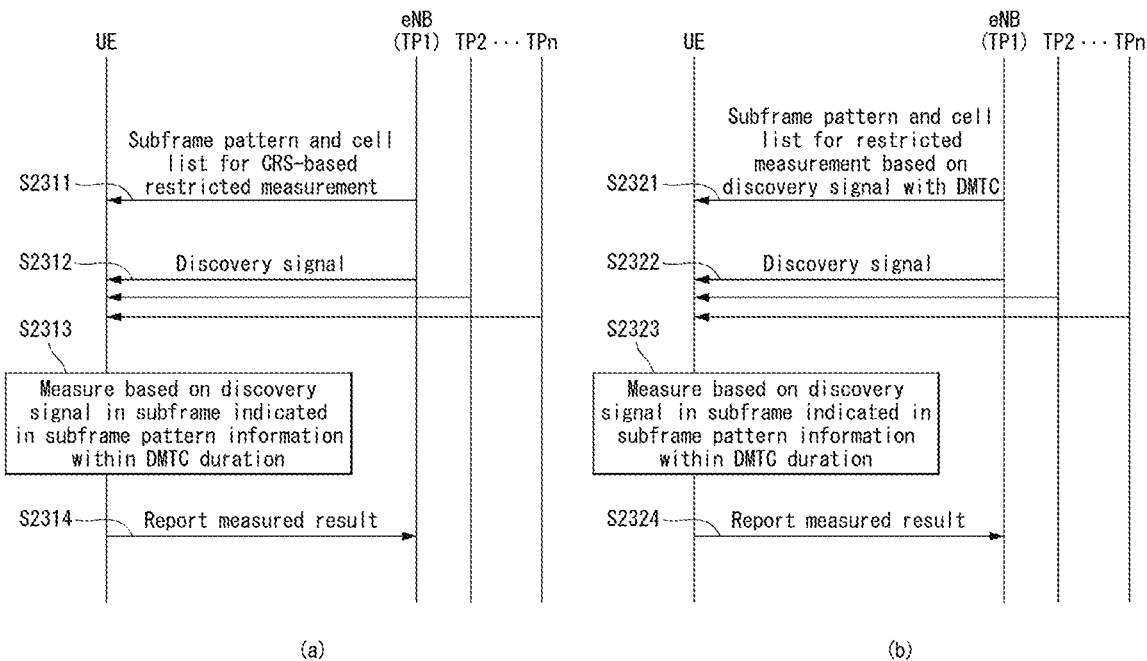
[FIG. 24]
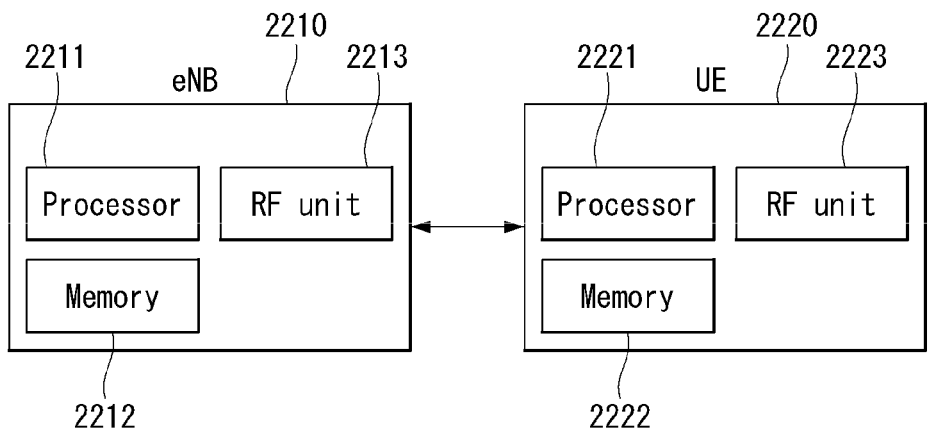

METHOD FOR PERFORMING MEASUREMENT IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2015/008313, filed on Aug. 7, 2015, which claims the benefit of U.S. Provisional Application No. 62/034,968, filed on Aug. 8, 2014, the contents of which are all hereby incorporated by reference herein in their entirety.

TECHNICAL FIELD

The present invention relates to wireless communication systems, and more particularly, to a method for performing a measurement based on a discovery signal in a wireless communication system and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The small cell enhancement technique supports the small cell on/off mechanism in order to save the energy of the small cell and to decrease the interference on a neighboring cell. In order to determine the state of small cell in a user equipment, the small cell broadcasts a discovery signal periodically regardless of the on/off state.

An object of the present invention is to propose a method of performing measurement based on a discovery signal and reporting the measured result in a user equipment.

Further, another object of the present invention is to propose a method of setting the number of transmission antenna ports of a discovery signal for measurement based on the discovery signal.

Further, another object of the present invention is to propose a method of performing a restricted measurement based on a discovery signal in a user equipment.

Technical Solution

In an aspect of the present invention, a method of performing, by a user equipment, measurement in a wireless communication system may include receiving a discovery signal by the user equipment and measuring, by the user equipment, a reference signal receive power (RSRP) and/or a reference signal received quality (RSRQ) based on the discovery signal, in which a number of antenna ports of a cell-specific reference signal (CRS) is not applied to measurement based on the discovery signal.

In another aspect of the present invention, a user equipment for performing measurement in a wireless communication system includes a radio frequency (RF) unit for transmitting and receiving a wireless signal and a processor for controlling the user equipment, in which the processor is configured to receive the discovery signal and measure a reference signal receive power (RSRP) and/or a reference signal received quality (RSRQ) based on the discovery signal, in which a number of antenna ports of a cell-specific reference signal (CRS) is not applied to measurement based on the discovery signal.

Preferably, the method may further include receiving antenna ports number information of the discovery signal from a base station.

Preferably, the antenna ports number information of the discovery signal may indicate whether antenna port 1 is used for transmission of the discovery signal.

Preferably, the antenna ports number information of the discovery signal may indicate not using the antenna port 1, antenna port 0 is used to determine the RSRP and/or the RSRQ.

Preferably, if the antenna port 1 is reliably detected, the antenna port 1 as well as the antenna port 0 may be used to determine the RSRP and/or the RSRQ.

Preferably, when the antenna ports number information of the discovery signal indicates using the antenna port 1, the antenna port 0 and the antenna port 1 may be used to determine the RSRP and/or the RSRQ.

Preferably, the antenna ports number of the discovery signal may be predetermined.

Preferably, the method may further include receiving, by the user equipment, a first subframe pattern for CRS-based restricted measurement and a cell list having the first subframe pattern applied thereto.

Preferably, the measurement based on the discovery signal may be performed in a subframe indicated by the first subframe pattern within a discovery signal measurement timing configuration (DMTC) duration monitoring the discovery signal.

Preferably, the method may further include receiving, by the user equipment, a second subframe pattern for restricted measurement based on the discovery signal within the DMTC duration monitoring the discovery signal and a cell list having the second subframe pattern applied thereto.

Preferably, the measurement based on the discovery signal may be performed in a subframe indicated by the second subframe within the DMTC duration.

Preferably, when a cell belonging to the cell list having the first subframe pattern applied thereto and a cell belonging to the cell list having the second subframe pattern applied thereto are overlapped, only a restricted measurement based on the discovery signal or a restricted measurement based on the CRS may be performed for the overlapped cell.

Preferably, when a cell belonging to the cell list having the first subframe pattern applied thereto and a cell belonging to the cell list having the second subframe pattern applied thereto are overlapped, the CRS-based restricted measurement may be performed for the overlapped cell in a subframe indicated by the first subframe pattern within the DMTC duration.

Preferably, when a cell belonging to the cell list having the first subframe pattern applied thereto and a cell belonging to the cell list having the second subframe pattern applied thereto are overlapped, a restricted measurement based on the discovery signal may be performed for the overlapped cell in a subframe indicated by the second subframe pattern in the DMTC duration, and a the CRS-based restricted measurement may be performed in a subframe indicated by the first subframe pattern in a duration other than the DMTC duration.

Advantageous Effects

In accordance with an embodiment of the present invention, in a wireless communication system, a user equipment can smoothly perform measurement based on a discovery signal and report the measured result.

Furthermore, in accordance with an embodiment of the present invention, in a wireless communication system, a user equipment can smoothly perform measurement based on a discovery signal according to the number of transmission antenna ports of a discovery signal.

Furthermore, in accordance with an embodiment of the present invention, in a wireless communication system, a user equipment can smoothly perform restricted measurement based on a discovery signal.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 is a diagram illustrating a downlink HARQ process in an LTE FDD system

FIG. 9 is a diagram illustrating an uplink HARQ process in an LTE FDD system.

FIG. 10 illustrates a radio frame structure for transmitting the Synchronization Signal (SS) in a wireless communication system to which the present invention may be applied.

FIG. 11 illustrates a structure that two sequences for generating the secondary synchronization signal are mapped in the physical region with being interleaved.

FIG. 12 illustrates a reference signal pattern mapped to a downlink resource block pair in the wireless communication system to which the present invention can be applied.

FIG. 13 illustrates a periodic transmission scheme of CSI-RS in a wireless communication system to which the present invention may be applied.

FIG. 14 illustrates an aperiodic transmission scheme of CSI-RS in a wireless communication system to which the present invention may be applied.

FIG. 15 is a diagram illustrating the CSI-RS configuration in a wireless communication system to which the present invention may be applied.

FIG. 16 is a diagram illustrating a small cell cluster/group to which the present invention may be applied.

FIG. 17 is a diagram illustrating a resource block to which the CSI-RS is mapped in a wireless communication system to which the present invention may be applied.

FIG. 18 is a diagram for describing a measurement method based on a discovery signal according to an embodiment of the present invention.

FIG. 19 is a diagram for describing a measurement method based on a discovery signal according to an embodiment of the present invention.

FIG. 20 is a diagram for describing a measurement method based on a discovery signal according to an embodiment of the present invention.

FIGS. 21 to 23 are diagrams for describing a measurement method according to an embodiment of the present invention.

FIG. 24 is a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station.

The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical spirit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention may be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subsequent subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = (N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and a carrier aggregation in a wireless communication system to which an embodiment of the present invention may be applied.

FIG. 7a shows the structure of a single carrier used in an LTE system. A component carrier includes a DL CC and an UL CC. One component carrier may have a frequency range of 20 MHz.

FIG. 7b shows the structure of a carrier aggregation used in an LTE-A system. FIG. 7b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Coordinated Multi-Point Transmission and Reception (CoMP)

According to a demand of LTE-advanced, the CoMP transmission is proposed in order to improve the performance of the system.

The CoMP is referred to as the scheme for two or more eNBs, (Access) Points or Cells cooperate with each other and communicate with a UE in order to perform smoothly communication between a specific UE and an eNB, (Access) Point or Cell. The CoMP is also called co-MIMO, collaborative MIMO, network MIMO, and the like. It is anticipated that the CoMP will improves the performance of the UE positioned at a cell boundary and improve an average throughput of the cell (sector).

In this specification, eNB, (Access) Point and Cell is used of the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In case of JP method, the data headed from each eNB that performs the CoMP to a UE is transmitted to a UE instantaneously and simultaneously, and the UE combines the signal from each of the eNBs so as to improve the reception performance. On the other hand, in the case of the CS/CB, the data headed to a single UE is transmitted instantaneously through a single eNB, and the Scheduling or Beamforming is performed such that the interference exerted on another eNB by the UE becomes the minimum.

In the JP method, data may be used in each point (ie, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Hybrid-Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 8 is a diagram illustrating a downlink HARQ process in an LTE FDD system, and FIG. 9 is a diagram illustrating an uplink HARQ process in an LTE FDD system.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Synchronization Signal (SS)

A UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

FIG. 10 illustrates a radio frame structure for transmitting the Synchronization Signal (SS) in a wireless communication system to which the present invention may be applied.

Particularly, FIG. 10 illustrates the radio frame structure for transmitting the SS and the Physical Broadcast Channel (PBCH) in the frequency division duplex (FDD). FIG. 10(a) illustrates a transmission position of the SS and the PBCH in the radio frame configured with a normal cyclic prefix (CP), and FIG. 10(b) illustrates a transmission position of the SS and the PBCH in the radio frame configured with an extended CP.

SSs are divided into a PSS and an SSS. The PSS is used to obtain the time domain synchronization and/or the frequency domain synchronization such as the OFDM symbol synchronization, the slot synchronization, and so on, and the SSS is used to obtain the frame synchronization, a cell group ID and/or a CP configuration (i.e., usage information on the normal CP or the extended CP) of a cell.

Referring to FIG. 10, the PSS and the SSS in the time domain are transmitted on two OFDM symbols in every radio frame, respectively. Specifically, the SSs are transmitted on the first slot of subframe 0 and the first slot of subframe 5, respectively, in consideration of a Global System for Mobile communication (GSM) frame length, 4.6 ms, for facilitation of inter radio access technology (RAT) measurement. In particular, the PSS is transmitted on the last OFDM symbol of the first slot of subframe 0 and the last OFDM symbol of the first slot of subframe 5, and the SSS is transmitted on the second last OFDM symbol of the first slot of subframe 0 and the second last OFDM symbol of the first slot of subframe 5.

The boundary of a corresponding radio frame may be detected through the SSS. The PSS is transmitted on the last OFDM symbol of a corresponding slot, the SSS is transmitted on the immediately before the OFDM symbol of the PSS. The transmission diversity scheme of the SS uses only a single antenna port, and is not separately defined in the standard. That is, a single antenna port transmission scheme or a transmission scheme transparent to the UE (e.g., the precoding vector switching (PVS), the time switched diversity (TSTD), and the cyclic delay diversity (CDD)) may be used for the transmission diversity of the SS.

The PSS is transmitted on every 5 ms, and accordingly, the UE may recognize that the corresponding subframe is one of subframe 0 and subframe 5 by detecting the PSS, but may not specifically identify the subframe as subframe 0 or subframe 5. Accordingly, the UE is not capable of recognizing a boundary of radio frames with the PSS alone. That is, the frame synchronization cannot be acquired with the PSS alone. The UE detects the boundary of radio frames by detecting the SSS transmitted twice with different sequences in one radio frame.

In the frequency domain, the PSS and the SSS are mapped to six RBs positioned on the center of the downlink system bandwidth. In a downlink, the entire RBs includes different number of RBs (e.g., 6 RBs to 110 RBs) depending on the system bandwidth, but a UE may detect the PSS and the SSS in the same way since the PSS and the SSS are mapped to 6 RBs positioned on the center of the downlink system bandwidth.

Both of the PSS and the SSS include the sequence that has the length of 62. Accordingly, the PSS and the SSS are mapped to 62 subcarriers on the center, which are located at opposite sides of the DC subcarrier among 6 RBs, and the DC subcarrier and each of 5 subcarriers located at opposite side ends are not used.

A UE may obtain the physical layer cell ID from a specific sequence of the PSS and the SSS. That is, the combination of 3 PSSs and 168 SSSs, the SS may represent total 504 specific physical layer cell IDs.

In other words, the physical layer cell IDs are grouped into 168 physical-layer cell-ID groups that include three specific IDs in each group such that each of the physical layer cell IDs becomes a part of only one physical-layer cell-ID group. Accordingly, the physical layer cell ID N_ID^cell=3N_ID^(1)+N_ID^(2) is specifically defined by the number N_ID^(1) within the range of 0 to 167 that represents the physical-layer cell-ID group and the number N_ID^(2) within the range of 0 to 2 that represents the physical-layer ID in the physical-layer cell-ID group.

A UE may know one of three specific physical-layer IDs by detecting the PSS and may recognize one of 168 physical layer cell IDs related to the physical-layer ID by detecting the SSS.

The PSS is generated based on the Zadoff-Chu (ZC) sequence that includes the length of 63 which is defined in the frequency domain.

$$d_u(n) = e^{-j\frac{\pi u n(n+1)}{N_{ZC}}} \quad \text{[Equation 12]}$$

The ZC sequence is defined by Equation 12. And the sequence element n=31, corresponding to the DC subcarrier, is punctured. In Equation 12, N_ZC=63.

The remaining 9 subcarriers among 6 RBs (=72 subcarriers) in the center portion of the system bandwidth are always transmitted with zero value, which leads to the ease in designing the filter for performing synchronization.

In order to define total three PSSs, the values u=25, 29 and 34 are used in Equation 12. In this case, since 29 and 34 are in conjugated symmetry relation, two correlations may be simultaneously performed. Herein, the conjugate symmetry means the relation shown in Equation 13 below. Using the characteristics, the implementation of one-shot correlator for u=29 and 34 is available, which may decrease about 33.3% in overall amount of operations.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$

The SSS is generated based on the M-sequence. Each SSS sequence is generated by concatenating SSC 1 sequence and SSC 2 sequence, which is two interleaved sequences, of which length is 31 in the frequency domain. By combining two sequences, 168 cell group IDs are transmitted. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of UE.

FIG. 11 illustrates a structure that two sequences for generating the secondary synchronization signal are mapped in the physical region with being interleaved.

When two m-sequences used for generating the SSS sign are defined by SSS 1 and SSS 2, in the case that the SSS (SSS 1, SSS 2) of subframe 0 transmits the cell group ID with the combination, the SSS (SSS 2, SSS 1) of subframe 5 is transmitted with being swapped, thereby distinguishing the 10 ms frame boundary. In this case, the SSS sign uses the generation polynomial $x^5+x^2+1$, and total 31 signs may be generated through the circular shift.

In order to improve the reception performance, two different PSS-based sequences are defined and scrambled to the SSS, and scrambled to SSS 1 and SSS 2 with different sequences. Later, by defining the SSS 1-based scrambling sign, the scrambling is performed to SSS 2. In this case, the sign of SSS is exchanged in a unit of 5 ms, but the PSS-based scrambling sign is not exchanged. The PSS-based scrambling sign is defined by six circular shift versions according to the PSS index in the m-sequence generated from the generation polynomial $x^5+x^2+1$, and the SSS 1-based scrambling sign is defined by eight circular shift versions according to the SSS 1 index in the m-sequence generated from the generation polynomial $x^5+x^4+x^2+x^1+1$.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal used for a data demodulation for a specific terminal. Information for demodulation and channel measurement may be provided by using the reference signals. The dedicated reference signal is used only for data demodulation only, while the CRS is used for multiple purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The dedicated reference signal may be transmitted through resource elements when data demodulation on the PDSCH is required. The terminal may receive whether the DRS is present through the upper layer and is valid only when the corresponding PDSCH is mapped. The dedicated reference signal may be referred to as the UE-specific RS or the demodulation RS (DMRS).

FIG. 12 illustrates a reference signal pattern mapped to a downlink resource block pair in the wireless communication system to which the present invention can be applied.

Referring to FIG. 12, as a unit in which the reference signal is mapped, the downlink resource block pair may be expressed by one subframe in the timedomain x 12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 14]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 14, k and l represent the subcarrier index and the symbol index, respectively and p represents the antenna port. N_symb^DL represents the number of OFDM symbols in one downlink slot and N_RB^DL represents the number of radio resources allocated to the downlink. n_s represents a slot index and, N_ID^cell represents a cell ID. mod represents an modulo operation. The position of the reference signal varies depending on the v_shift value in the frequency domain. Since v_shift depends on the cell ID (i.e., physical layer cell ID), the position of the reference signal has various frequency shift values according to the cell.

In more detail, the position of the CRS may be shifted in the frequency domain according to the cell in order to improve channel estimation performance through the CRS.

For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 15 shows the case of the normal CP and Equation 14 shows the case of the extended CP.

$$k = (k') \bmod N_{sc}^{RB} + N_{sc}^{RB} \cdot n_{PRB} \quad \text{[Equation 15]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 16]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 15 and 16, k and l represent the subcarrier index and the symbol index, respectively and p represents the antenna port. N_sc^RB represents the size of the resource block in the frequency domain and is expressed as the number of subcarriers. n_PRB represents the number of physical resource blocks. N_RB^PDSCH represents a frequency band of the resource block for the PDSCH transmission. n_s represents the slot index and N_ID^cell represents the cell ID. mod represents the modulo operation. The position of the reference signal varies depending on the v_shift value in the frequency domain. Since v_shift depends on the cell ID (i.e., physical layer cell ID), the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes at least 4 downlink transmitting antennas or maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which UE belongs such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 13 illustrates a periodic transmission scheme of CSI-RS in a wireless communication system to which the present invention may be applied.

As shown in FIG. 13, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

FIG. 14 illustrates an aperiodic transmission scheme of CSI-RS in a wireless communication system to which the present invention may be applied.

FIG. 14 exemplifies the scheme that the CSI-RS is transmitted with a transmission subframe pattern. The CSI-RS transmission pattern includes 10 subframes, and whether to transmit the CSI-RS is designated by 1 bit indicator in each subframe.

Generally, the following two schemes are considered as the scheme by which an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

The CSI-RS-Config information element (IE) is used for specifying the CSI-RS configuration.

Table 2 exemplifies the CSI-RS-Config IE.

TABLE 2

```
-- ASN1START
CSI-RS-Config-r10 ::=       SEQUENCE {
    csi-RS-r10                  CHOICE {
        release                     NULL,
        setup                       SEQUENCE {
            antennaPortsCount-r10       ENUMERATED {an1, an2,
                                                    an4, an8},
            resourceConfig-r10          INTEGER (0..31),
            subframeConfig-r10          INTEGER (0..154),
            p-C-r10                     INTEGER (-8..15)
        }
    }                                                       OPTIONAL,
    -- Need ON
    zeroTxPowerCSI-RS-r10       CHOICE {
        release                     NULL,
        setup                       SEQUENCE {
            zeroTxPowerResourceConfigList-r10 BIT STRING (SIZE (16)),
            zeroTxPowerSubframeConfig-r10     INTEGER (0..154)
        }
    }                                                       OPTIONAL
    -- Need ON
}
-- ASN1STOP
```

Referring to Table 2, the 'antennaPortsCount' field indicates the number of antenna ports used for transmitting the CSI-RS. The 'resourceConfig' field indicates the CSI-RS configuration. The 'SubframeConfig' field and the 'zeroTxPowerSubframeConfig' field indicate the subframe configuration (I_CSI-RS) on which the CSI-RS is transmitted.

The 'zeroTxPowerResourceConfigList' field indicates the zero-power (ZP) CSI-RS configuration. In the bitmap of 16 bit that configures the 'zeroTxPowerResourceConfigList' field, the CSI-RS configuration that corresponds to the bit configured as '1' may be configured as the ZP CSI-RS.

The 'p-c' field represents the parameter (P_C) assumed by a ratio of the PDSCH Energy Per Resource Element (EPRE) and the CSI-RS EPRE.

The CSI-RS is transmitted through 1, 2, 4 or 8 antenna ports. In this case, the antenna port which is used is p=15, p=15,16, p=15, . . . , 18, p=15, . . . , 22. The CSI-RS may be defined only for the subcarrier interval $\Delta f=15$ kHz.

The CSI-RS sequence may be generated by Equation 17 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$
[Equation 17]

Herein, r_l,n_s(m) represents the generated CSI-RS sequence, c(i) represents the pseudo-random, n_s is a slot number in a radio frame, l represents an OFDM symbol number in a slot, and N_RB^max,DL represents the maximum RB number in a downlink bandwidth.

The pseudo-random sequence generator is initialized in every OFDM start as represented by Equation 18 below.

$$c_{init} = 2^{10} \cdot (7 \cdot (n_S+1)+l+1) \cdot (2 \cdot N_{ID}^{cell}+1)+2 \cdot N_{ID}^{cell}+N_{CP}$$ [Equation 18]

In Equation 18, N_ID^cell represents the cell ID, N_CP=1 in the case of the normal CP and N_CP=0 in the case of the extended CP.

In the subframe configured to transmit the CSI-RS, the CSI-RS sequence generated through Equation 17 is mapped to the complex-valued modulation symbol a_k,l^(p) that is used as a reference symbol on each antenna port (p) as represented by Equation 19 below.

$$a_{k,l}^{(p)} = w_{l''} \cdot r_{l,n_s}(m')$$ [Equation 19]

$$k = k' + 12m +
\begin{cases}
-0 & \text{for } p \in \{15, 16\}, \text{normal cyclic prefix} \\
-6 & \text{for } p \in \{17, 18\}, \text{normal cyclic prefix} \\
-1 & \text{for } p \in \{19, 20\}, \text{normal cyclic prefix} \\
-7 & \text{for } p \in \{21, 22\}, \text{normal cyclic prefix} \\
-0 & \text{for } p \in \{15, 16\}, \text{extended cyclic prefix} \\
-3 & \text{for } p \in \{17, 18\}, \text{extended cyclic prefix} \\
-6 & \text{for } p \in \{19, 20\}, \text{extended cyclic prefix} \\
-9 & \text{for } p \in \{21, 22\}, \text{extended cyclic prefix}
\end{cases}$$

$$l = l' + \begin{cases} l'' & \text{CSI reference signal configurations } 0\text{-}19, \text{normal cyclic prefix} \\ 2l'' & \text{CSI reference signal configurations } 20\text{-}31, \text{normal cyclic prefix} \\ l'' & \text{CSI reference signal configurations } 0\text{-}27, \text{extended cyclic prefix} \end{cases}$$

-continued $$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 19 above, (k',l') (herein, k' is a subcarrier index in a resource block, and l' represents an OFDM symbol index in a slot) and the condition of n_s is determined according to the CSI-RS configuration shown in Table 3 or Table 4 below.

Table 3 exemplifies the mapping of (k',l') according to the CSI-RS configuration for the normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k',l') according to the CSI-RS configuration for the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |

TABLE 4-continued

| CSI reference | | Number of CSI reference signals configured | | | | | |
|---|---|---|---|---|---|---|---|
| signal | | 1 or 2 | | 4 | | 8 | |
| | configuration | (k', l') | $n_s$ mod 2 | (k', l') | $n_s$ mod 2 | (k', l') | $n_s$ mod 2 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure | 16 | (11, 1) | 1 | (11, 1) | 1 | (11, 1) | 1 |
| type 2 only | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighboring cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and n_s are determined according to the CSI-RS configuration. By applying these values to Equation 19, the time-frequency resource that each CSI-RS antenna port uses for transmitting the CSI-RS is determined.

FIG. 15 is a diagram illustrating the CSI-RS configuration in a wireless communication system to which the present invention may be applied.

Particularly, FIG. 15 exemplifies the CSI-RS configuration (i.e., the case of normal CP) according to Equation 19 and Table 3.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of (n_s mod 2) in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S(S={15}, S={15,16}, S={17,18}, S={19,20} or S={21, 22})) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; T_CSI-RS) for transmitting the CSI-RS and the subframe offset ($\Delta$_CSI-RS) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Referring to Table 5, according to the CSI-RS subframe configuration (I_CSI-RS), the CSI-RS transmission period (T_CSI-RS) and the subframe offset ($\Delta$_CSI-RS) are determined.

The CSI-RS subframe configuration in Table 5 is configured as one of the 'SubframeConfig' field and the 'zeroTx-PowerSubframeConfig' field in Table 2 above. The CSI-RS subframe configuration may be separately configured for the NZP CSI-RS and the ZP CSI-RS.

The subframe including the CSI-RS satisfies Equation 20 below.

$$(10n_f + \lfloor n_S/2 \rfloor - \Delta_{CSI-RS}) \bmod T_{CSI-RS} = 0 \quad [\text{Equation 20}]$$

In Equation 20, T_CSI-RS represents the CSI-RS transmission period, $\Delta$_CSI-RS represents the subframe offset value, n_f represents the system frame number, and n_s represents the slot number.

In the case of a UE to which transmission mode 9 is set for a serving cell, a single CSI-RS resource may be set to the UE. In the case of a UE to which transmission mode 10 is set for a serving cell, one or more CSI-RS resources may be set to the UE.

For each CSI-RS resource configuration, the following parameters may be set through high layer signaling.

In the case that transmission mode 10 is set, the CSI-RS resource configuration identifier The number of CSI-RS ports The CSI-RS configuration (refer to Table 3 and Table 4)

The CSI-RS subframe configuration (I_CSI-RS; refer to Table 5)

In the case that transmission mode 9 is set, the transmission power (P_C) for the CSI feedback In the case that transmission mode 10 is set, the transmission power (P_c) for the CSI feedback with respect to each CSI process. When the CSI subframe sets C_CSI,0 and C_CSI,1 are set by a high layer for the CSI process, P_c is set for each CSI subframe set of the CSI process.

The pseudo-random sequence generator parameter (n_ID)

In the case that transmission mode 10 is set, the QCL scrambling identifier (qcl-ScramblingIdentity-r11) for assuming of the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfigList-r11) parameter When the CSI feedback value obtained by a UE has the value in the range of [−8, 15] dB, P_c is presumed by the ratio of the PDSCH EPRE for the CSI-RS EPRE. Herein, the PDSCH EPRE corresponds to the symbol in which the ratio of PDSCH EPRE for the CRS EPRE is $\rho$_A.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration (I_CSI-RS; refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be set to the UE for the serving cell. For the UE to which transmission mode 10 is set, one or more ZP CSI-RS resource configurations may be set to the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration (I_CSI-RS; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and 11th OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Measurement Method Based on Discovery Signal

The Research on the techniques regarding the small cell enhancement (SCE) for small cells to cover a relatively very small area using less power compared with the existing macro cells is intensively underway in order to cover the data traffic that is explosively increasing.

The small cell enhancement means a technique for enabling efficient mobility management while covering increasing traffic by densely arranging small cells in macro cell coverage (or without macro cell coverage in the case of the inside of a building) and dramatically increasing spectrum efficiency per unit area through close cooperation between a macro cell eNB and a small cell eNB or between small cell eNBs. In particular, in a certain region such as a so-called hot spot in the cell, there is a specially high communication demand, and in some regions such as cell edges or coverage holes, the reception of radio waves may be decreased, so that small cells may be utilized in the region with high demand for data services such as hot spots or communication shadow areas that is not covered by macro cells alone.

The macro cell eNB may be referred to as macro eNB (MeNB), and the small cell eNB may be referred to as small eNB, secondary eNB (SeNB).

The small cell enhancement supports the small cell on/off mechanism that maintains the on-state of the small cell only if a UE exists in the small cell coverage for the energy saving of the small cell and for decreasing the interference on a neighboring cell or that maintains the off-state of the small cell.

Since the UE mobility management (e.g., handover, etc.) is performed based on the frequency (for example, (component) carrier, cell, frequency band) of the macro cell, the connection between the UE and the network is not completely disconnected even though a part of the small cell is in the off-state.

The discovery procedure is required for the small cell in the UE to determine the on/off state.

For this, regardless of the on/off-state, the small cell is defined to transmit (i.e., broadcast) the discovery signal (or discovery reference signal; DRS) always.

Hereinafter, the 'discovery signal' is referred to as DRS.

In other words, the DRS is broadcasted in a predetermined period even in the case that the small cell is in the off-state. The predetermined period may assumed to be a measurement period or DRS/discovery signal measurement timing configuration (DMTC), and may be correspond to 40 ms, 80 ms, 160 ms, and the like, for example. In this case, the small cell may maintain the on-state for broadcasting the DRS for a predetermined time (e.g., one to five subframes). For example, in the case that the measurement period is 40 ms, the DRS is broadcasted during 6 ms while the on-state being maintained, and the off-state may be maintained for the rest 34 ms.

As such, the duration for transmitting the DRS may be called a measurement window or a discovery signal occasion (DRS occasion). That is, the discovery signal occasion includes consecutive frame durations (e.g., one (or two) to five consecutive subframe durations), and one discovery signal occasion may be existed in every measurement period (or DMTC period).

A UE performs a measurement based on the DRS that is received from a small cell, and transmits a measurement report to an eNB (or network). As such, the eNB may recognize the small cell of the most efficient around the corresponding UE by having the UE measure the DRS transmitted from the small cell and report the result to the eNB (or network) regardless of the small cell being in on/off-state. For example, as a result of the measurement result from the UE, the eNB (network) may switch the small cell that is in the off-state but has the great DRS reception power from the UE to the on-state.

In the dense small cell scenario, a UE may be connected to an overlaid macro cell, and a small cell may be used for data offloading. In such a case, it is preferable that the UE discovers a lot of cells in a communication range, and the overlaid macro layer selects an optimal cell by considering not only the loading information but also other information.

In other words, the optimal cell for data offloading may not be the cell that is selected based on the RSRP/RSRQ/RSSI. But rather, the cell that has low loading or many users may be more preferable in the aspect of overall cell management. Accordingly, an advanced discovery procedure may be considered for searching more cells than being performing the existing mechanism.

The following characteristics may be considered with respect to the advanced discovery signal.

Search more cells than the legacy PSS/SSS/CRS based on cell discovery

Search cells in a time shorter than a subframe

Perform a search in a time shorter than a subframe

Support a measurement required for the fast time scale on/off operations

The following several candidates may be considered as the discovery signal for the advanced discovery algorithm.

(1) PSS/(SSS)+CRS (2) PSS/(SSS)+CSI-RS (3) PSS/(SSS)+PRS (4) Or, the combination of one or more options among (1) to (3) above It is anticipated that a discovery signal may be used for the coarse time/frequency tracking, a measurement and a Quasi Co-Located (QCL) case (if it is required). Considering several purposes, the discovery signal should be designed to satisfy the following requirements.

(1) Under the assumption of very high initial timing error (e.g., ±2.5 ms), the discovery signal should support the coarse time synchronization.

(2) The discovery signal should support the adequate accuracy in a measurement.

In order to support requirements (1) and (2), it may be assumed that the PSS and/or the SSS may be transmitted.

For a simple configuration, the following limit condition may be considered for the period of the advanced discovery signal.

(1) A plurality of measurement gap periods: for example, 40 msec, 80 msec, 160 msec or 320 msec (a plurality of new measurement gap periods may be considered when a new measurement gap period is set.)

(2) DRS cycle and alignment: 10, 20, 32, 40, 64, 80, 128, 160, 256, 320, 512, 640, 1024, 1280, 2048 and 2560 (if a UE may perform a measurement using the legacy signal for a serving cell, this requirement may be excluded.)

(3) When the PSS/SSS is transmitted as a discovery signal, the period of the discovery signal may be a multiple of 5 msec such that the PSS/SSS that is transmitted for the advance discovery signal may be replaced by the PSS/SSS that is transmitted in the on-state. If the discovery signal is not transmitted in the on-state, this requirement may be excluded.

In addition, in order to prevent the influence on the legacy UE, different periods from the PSS/SSS may be considered. That is, the PSS/SSS may be transmitted during the on-state, and an additional PSS/SSS may be transmitted for the discovery signal transmission. In the case that the DRS-PSS and the DRS-SSS are additionally transmitted separately from the PSS/SSS that is transmitted in the on-state, the cell ID acquired from the DRS-PSS/DRS-SSS may be different from the cell ID acquired from the PSS/SSS.

The QCL relation will be described. As an example of the case between two antenna ports, in the case that the large-scale property of the radio channel in which a symbol is transmitted through an antenna port may be inferred from the radio channel in which a symbol is transmitted through another antenna port, it may be called that the two antenna ports are in the QCL relation (or be QCL). Here, the large-scale property includes one or more of the delay spread, the Doppler spread, the Doppler shift, the average gain and the average delay.

That is, the fact that two antenna ports are in the QCL relation means that the large-scale property of the radio channel from an antenna port is the same as the large-scale property of the radio channel from another antenna port. Considering a plurality of antenna ports in which the RS is transmitted, when the antenna ports in which different two types of RSs are transmitted are in the QCL relation, the large-scale property of the radio channel from a type of antenna port may be replaced by the large-scale property of the radio channel from another type of antenna port.

According to the concept of QCL, a UE may not assume the same large-scale property between the radio channels from the corresponding antenna ports for non-QCL antenna ports. That is, in this case, the UE should perform the independent processing for each non-QCL antenna port that is configured for the timing acquisition and tracking, the frequency offset and compensation, the delay estimation and the Doppler estimation, and so on.

Between the antenna ports in which the QCL relation is assumed, there is an advantage that a UE may perform the following operations.

With respect to the delay spread and the Doppler spread, a UE may apply the estimated result of the power-delay-profile, the delay spread and the Doppler spectrum, the Doppler spread for the radio channel from an antenna port to the Wiener filter and the like that are used in the channel estimation for the radio channel from another antenna port.

With respect to the frequency shift and the received timing, a UE may perform the time and frequency synchronization for an antenna port, and may apply the same synchronization to the demodulation of another antenna port.

With respect to the average reception power, a UE may take an average of the Reference Signal Received Power (RSRP) for two or more antenna ports.

FIG. 16 is a diagram illustrating a small cell cluster/group to which the present invention may be applied.

As shown in FIG. 16, the "shared cell-ID scenario" means the scenario that a plurality of transmission points (TPs) in a specific (small cell) cluster/group uses the same Physical cell-ID (PCID). Even in the case that the TPs in a cluster/group use the same PCID, each of the clusters (Cluster A and Cluster B) uses different PCIDs, respectively.

In this case, the PCID may mean a Cell-specific ID that is used for transmitting the PSS/SSS and CRS like the current LTE system, or may be separate cluster/group ID that is commonly used in a specific cluster/group.

When the TPs belonged to the same cluster/group share the same PCID, the common signal (i.e., the PSS/SSS, CRS, etc. that are scrambled using the same PCID) is transmitted on the same resource from all TPs that have the same PCID.

As such, a plurality of TPs transmits the same signal using the same resource, and accordingly, the reception signal quality may be improved and the shaded area may be prevented. In addition, since a UE recognizes as if a single signal is transmitted from a single TP, the cell research or the handover is not performed by the UE for the same cluster/group, thereby the control signaling being decreased.

In order to obtain an additional cell-splitting gain between a plurality of TPs in the cluster/group, the specific identification information may be added to each of the TPs. This is called the Transmission Point ID (TPID). That is, in the case of transmitting a TP-specific signal (i.e., the RS that is scrambled with the TPID, etc.), the TP-specific signal may be transmitted independently to each of the TPs.

For example, each TPID may be used as the sequence scrambling initialization parameter of the CSI-RS that is transmitted from the corresponding TP, and may also be used for transmitting another TP-specific RS.

Hereinafter, in the present invention, the situation that each TP transmits the unique TP-specific discovery signal (hereinafter, referred to as the Discovery RS (DRS)) is considered.

Hereinafter, for the convenience of description, it is assumed and described that the DRS transmitted by each TP is the CSI-RS, but the present invention is not limited thereto. That is, the TP-specific RS except the CSI-RS may be defined and used in the present invention.

The use of the CSI-RS up to 3GPP LTE Release-11 standard is for a UE to measure the CSI and to perform the CSI feedback report, and the CSI-RS transmitted in the use is referred to as "FB-CSI-RS" below, for the convenience of description. In addition, the CSI-RS transmitted as a TP-specific DRS is referred to as "DRS-CSI-RS" that is distinguished from the FB-CSI-RS, for the convenience of description.

In addition, in the present invention, it is also considered that a cell ID (physical cell ID (PCID), a scramble ID for the CRS) is used for the scramble sequence ID of the DRS-CSI-RS. The Shared Cell ID exemplified above is a scenario that the TPID and the cell ID (i.e., PCID) may be differently given, but the present invention is not limited thereto.

FIG. 17 is a diagram illustrating a resource block to which the CSI-RS is mapped in a wireless communication system to which the present invention may be applied.

Particularly, FIG. 17 exemplifies the resource elements that are used for the CSI-RS when the CSI-RS configuration index is '0' in the normal CP structure. In FIG. 17, R_p represents the resource element used for transmitting the CSI-RS on antenna port 'p'.

The CSI-RSs for antenna ports 15 and 16 are mapped to the RE pair that corresponds to 10th subcarrier (within the resource block) of the 6th and 7th OFDM symbols (OFDM symbol indexes 5 and 6) of the first slot.

The CSI-RSs for antenna ports 17 and 18 are mapped to the RE pair that corresponds to 4th subcarrier (within the resource block) of the 6th and 7th OFDM symbols (OFDM symbol indexes 5 and 6) of the first slot.

The CSI-RSs for antenna ports 19 and 20 are mapped to the RE pair that corresponds to 9th subcarrier (within the resource block) of the 6th and 7th OFDM symbols (OFDM symbol indexes 5 and 6) of the first slot.

The CSI-RSs for antenna ports 21 and 22 are mapped to the RE pair that corresponds to 3th subcarrier (within the resource block) of the 6th and 7th OFDM symbols (OFDM symbol indexes 5 and 6) of the first slot.

As exemplified in FIG. 17, the CSI-RS may include up to maximum eight antenna ports, and the numbers 15, 16, . . . , 22 are given to each of the antenna ports. In addition, for example, the CSI-RS for antenna ports {15, 16}, {17, 18}, {19, 20} and {21, 22} is transmitted with being code division multiplexed (CDM) and overlapped in the same two RE positions.

When a specific cell transmits the CSI-RS that includes antenna port 15 only, in the case that the energy-per-RE (EPRE) value in the corresponding two REs is X and it is available to transmit with the full power, for the case of transmitting the CSI-RS for two antenna ports that includes antenna ports 15 and 16, the transmission power distribution for each CSI-RS for each antenna should be applied such that the summation of the CSI-RS transmission power for two antenna ports does not exceed the maximum power X, such as the half power of EPRE=X/2 for each CSI-RS for each antenna port is transmitted to the corresponding two REs.

The transmission power of the CSI-RS for different antenna ports (e.g., antenna ports 17 and 18, antenna ports 19 and 20, and antenna ports 21 and 22) that are transmitted with being CDM in the same RE is determined in the same way above.

Hereinafter, in the present invention, for the convenience of description, the case that the DRS-CSI-RS has the similar structure to the existing CSI-RS structure above is assumed and described.

The RE position in which the DRS-CSI-RS may be transmitted may be the same as the position in which the existing CSI-RS may be transmitted. In addition, in this case, some additional RE may be used, and the RE position may be changed.

In addition, the DRS-CSI-RS may not be transmitted in OFDM symbol #5 and #6 of the first slot in which the DRS-PSS and the DRS-SSS may be transmitted. Accordingly, only the remaining RE configuration except the RE configuration of the DRS-CSI-RS that is transmitted through OFDM symbol #5 and #6 of the first slot may be limited as the DRS-CSI-RS RE configuration of the DRS-CSI-RS. For example, in the case of normal CP, the CSI-RS configuration except CSI-RS configurations 0, 5, 10 and 11 in Table 3 above may be used for the RE configuration of the DRS-CSI-RS.

In addition, similar to the CSI-RS, the DRS-CSI-RS for a specific antenna port may be transmitted with being CDM with the DRS-CSI-RS for another antenna port throughout two REs.

That is, while the DRS-CSI-RS has the similar property to the CSI-RS above, the DRS-CSI-RS may have a separate property such as the DRS-CSI-RS may be configured as relatively longer period (e.g., 80 ms, 160 ms, etc.) than that of the CSI-RS. In other words, the configuration of the DRS-CSI-RS may be independent from that of the FB-CSI-RS, but the DRS-CSI-RS may use the legacy CSI-RS resource pattern for the purpose of the (small cell) discovery through the RRM (e.g., RSRP and/or RSRQ) report only.

The present invention proposes a method for solving the power averaging problem, and the like that may occur when a UE calculates the RRM e.g., RSRP and/or RSRQ) depending on how many antenna ports are included/configured, and reports the calculation result to an eNB (or network).

Hereinafter, for the convenience of description, the proposed method will be described based on the 3GPP LTE system. However, the scope of the system to which the proposed method is applied may be extended to other system except the 3GPP LTE system.

Particularly, in the present invention, the term, 'BS' described below is used as the inclusive term including a remote radio head (RRH), a transmission point (TP), the reception point (RP), a relay and an eNB (MeNB, SeNB, Micro eNB, Pico eNB, Femto eNB, etc.). Also, any one term of eNB, MeNB, SeNB, TP, RP, PPH and relay should be understood to be representative of other terms.

Hereinafter, in the present invention, it is assumed that the antenna port numbers in which the DRS-CSI-RS is transmitted are 201 to 208. In this case, it is assumed that antenna ports 201 to 208 are in the quasi co-located relation with antenna ports 15 to 22, respectively, which are used for transmitting the FB-CSI-RS.

However, the present invention is not limited thereto, and the DRS-CSI-RS may also be transmitted through antenna ports 15 to 22 similar to the FB-CSI-RS. In this case, except the fact that the DRS-CSI-RS is used for discovery (i.e., the fact that the transmission period is different from that of FB-CSI-RS), the DRS-CSI-RS may be configured in the same way of the FB-CSI-RS.

A UE may be configured with the number of transmission antenna ports of the DRS (and/or antenna port numbers) for each frequency (for example, (component) carrier, cell, frequency band) (and/or for each (small cell) cluster/group).

For example, in the case that Cluster A uses frequency f1 and Cluster B uses frequency f2 in the example of FIG. 16, the number of transmission antenna ports (and/or antenna port numbers) of the DRS may be configured for each frequency (i.e., f1 and f2) or for each (small cell) cluster/group (i.e., Clusters A and B). In addition, in the case that Cluster A uses frequencies f1 and f2 and Cluster B uses frequency f2, the number of transmission antenna ports of the DRS (and/or antenna port numbers) may be configured for each frequency (i.e., f1 and f2).

Here, the UE may receive the configuration information for the number of antenna ports from the macro BS belonged to each cluster, but the UE may also receive the configuration information for the number of antenna ports from each TP belonged to the corresponding cluster.

The number of antenna ports (and/or antenna port numbers) which is configured may be applied to the DRS-CRS and/or the DRS-CSI-RS.

For example, the UE may receive the configuration information of the number of transmission antenna ports and/or the antenna port numbers (e.g., 1-201, or 2-201 and 202, etc.) of the DRS (i.e., DRS-CRS and/or DRS-CSI-RS) for the carrier frequency of the corresponding measurement object in an Information Element (IE) such as "MeasObjectEUTRA" through the RRC signaling (e.g., RRC connection reconfiguration message, etc.).

This is just an example, and the UE may also receive the configuration information of the number of transmission antenna ports and/or the antenna port numbers of the DRS (i.e., DRS-CRS and/or DRS-CSI-RS) through a message format such as a separate IE, and the like.

Here, the antenna port numbers may be decided depending on the number of antenna ports, and in this case, even only the information of the number of antenna ports is delivered to the UE, the UE may know the antenna port numbers according to the number of antenna ports.

The UE assumes that all of the DRS transmitted by the (small) cells operated in a specific frequency configured transmit the corresponding DRS using the number of antenna ports and/or the antenna port numbers which is configured, and may try to detect the DRS. Through this procedure, there is an advantage that the UE may know the number of antenna ports (and/or antenna port numbers) in advance when detecting the DRS in the corresponding frequency and try to detect, and measure the RRM (e.g., RSRP and/or RSRQ) based on the detected DRS and report the measurement result to the BS.

In addition, the UE may be configured with the number of transmission antenna ports of the DRS for each (small cell) cluster with respect to a specific frequency (for example, (component) carrier, cell, frequency band) (or separately).

For example, in the case that Cluster A uses frequency f1 and Cluster B also uses frequency f1 in the example of FIG. 16, the number of transmission antenna ports (and/or antenna port numbers) of the DRS may be configured for frequency f1 and for each (small cell) cluster/group (i.e., Clusters A and B). In addition, in the case that Cluster A uses frequencies f1 and f2, and Cluster B uses frequency f2, the number of transmission antenna ports (and/or antenna port numbers) of the DRS may be configured for frequency f1 and for each (small cell) cluster/group (i.e., Clusters A and B), and the number of transmission antenna ports (and/or antenna port numbers) of the DRS may be configured for frequency f2 and for each (small cell) cluster/group (i.e., Clusters A and B).

Here, the UE may receive the configuration information for the number of antenna ports from the macro BS belonged to each cluster, but may also receive the number of antenna ports from each TP belonged to the corresponding cluster.

The number of transmission antenna ports (and/or antenna port numbers) configured may be applied to the DRS-CRS and/or the DRS-CSI-RS.

This is because the number of antenna ports of the transmission DRS (i.e., DRS-CRS and/or DRS-CSI-RS) may be different for each cluster since different management/operation may be applied to each cluster. Accordingly, by notifying the number of DRS antenna ports used for each cluster to the UE, when trying to detect the DRS transmitted in the corresponding cluster according to the detection result of the DRS-PSS/SSS transmitted from each cluster, the UE may detect the DRS according to the number of DRS transmission antenna ports which is configured for each indicated cluster, and calculate and report the RRM (e.g., RSRP and/or RSRQ) based on the detected DRS to the BS.

For example, the UE may receive the configuration information of the number of DRS transmission antenna ports and/or the antenna port numbers (e.g., 1-201, or 2-201 and 202, etc.) which is configured for each cluster in an Information Element (IE) such as "MeasObjectEUTRA" through the RRC signaling (e.g., RRC connection reconfiguration message, etc.).

This is just an example, and the UE may also receive the configuration information of the number of transmission antenna ports and/or the antenna port numbers of the DRS through a message format such as a separate IE, and the like.

Here, the antenna port numbers may be decided depending on the number of antenna ports, and in this case, even only the information of the number of antenna ports is delivered to the UE, the UE may know the antenna port numbers according to the number of antenna ports.

In this case, the concept of "cluster" may not be required to express in the RRC signaling.

Accordingly, it may be defined that two or more sets of the configuration information such as the number of DRS transmission antenna ports may be indicated separately for each frequency (for example, (component) carrier, cell or frequency band). That is, the information for each set may be the information that is going to be applied in the specific (small cell) cluster, and the UE performs the DRS detection which is separate for each set and the report operation of RRM (e.g., RSRP and/or RSRQ). For example, the "MeasObjectEUTRA" IE may indicate two or more sets of the number of transmission antenna ports of the DRS for the carrier frequency of the corresponding measurement object.

Otherwise, for example, by configuring the measurement object such as two or more "MeasObjectEUTRA" IEs that have the same frequency and by configuring different number of DRS transmission antenna ports in each measurement object, it may represented that two or more configurations of the number of antenna ports are existed (i.e., the number of DRS transmission antenna ports is different for each cluster) on the same frequency (for example, (component) carrier, cell or frequency band).

In addition, the system bandwidth information may be configured for each frequency (for example, (component) carrier, cell or frequency band) (and/or for each cluster) additionally.

For example, the information such as the system of 6 RBs, . . . , the system of 50 RBs is configured for each frequency (for example, (component) carrier, cell or frequency band) (and/or for each cluster), and the UE may detect the corresponding DRS (i.e., DRS-CRS and/or DRS-CSI-RS) based on the bandwidth information, and perform the report of RRM (e.g., RSRP and/or RSRQ).

In this case, the system bandwidth information may also represent the bandwidth information which is not the system bandwidth of an actual cell but in which the DRS (i.e., DRS-CRS and/or DRS-CSI-RS) is transmitted.

Here, the UE may receive the system bandwidth configuration information for each frequency (and/or for each cluster) from the macro BS belonged to each cluster or each TP belonged to the corresponding cluster.

For example, the UE may receive the configuration information of the system bandwidth configuration information for each frequency (and/or for each cluster) in an Information Element (IE) such as "MeasObjectEUTRA" through the RRC signaling (e.g., RRC connection reconfiguration message, etc.).

This is just an example, and the UE may also receive the configuration information of the system bandwidth configuration information for each frequency (and/or for each cluster) through a message format such as a separate IE, and the like.

As described above, in the case that a UE is configured with the number of DRS transmission antenna ports for each frequency (and/or for each cluster), the UE may assume that the number of transmission antenna ports of all DRS (i.e., DRS-CRS and/or DRS-CSI-RS) is the same for each frequency (and/or for each cluster).

And, according to this, the UE may perform the detection of the corresponding DRS and the report of RRM (e.g., RSRP and/or RSRQ). In this case, according to the number of antenna ports that is configured for the DRS-CSI-RS, the following UE operation may be defined and configured.

Hereinafter, for the convenience of description, the case that a UE is configured with the number of DRS transmission antenna ports for each frequency (and/or for each cluster) is assumed and described. However, the present invention is not limited thereto, and the present invention may be identically applied to the case that a UE is configured with number of DRS transmission antenna ports per each cluster for a specific frequency or the case that a UE is additionally configured with the system bandwidth.

In addition, for the convenience of description, the RSRP calculation and report performed by a UE are mainly described, but the present invention is not limited thereto. That is, it is also available that a UE calculates the RSRQ based on the calculated RSRP, and report it to a BS.

(1) In the case that a UE is configured with the number of DRS-CSI-RS transmission antenna ports=1 for each specific frequency (and/or for each cluster), the RSRP measurement operation of UE will be described. In this case, for the convenience of description, it is assumed that antenna port 201 is configured, and antenna ports 201 and 15 are in the QCL relation.

When calculating the RSRP for a specific cell, the UE may measure the RS reception power value for the DRS-CSI-RS transmission REs in antenna port 201 of the corresponding cell, and calculate the RSRP value by averaging the RS reception power value that is measured between different subframes and report it to a BS.

FIG. 18 is a diagram for describing a measurement method based on a discovery signal according to an embodiment of the present invention.

Referring to FIG. 18, when calculating the RSRP for a specific cell, a UE measures the RS reception power value for REs (R_201) which carry the DRS-CSI-RS in antenna port 201 throughout the measurement frequency bandwidth within a measurement duration, and calculates the linear average value.

Here, the measurement frequency bandwidth may be the system bandwidth (i.e., cell bandwidth), or the DRS transmission bandwidth configured by a BS, as described above.

The measurement duration may correspond to the measurement window (or the initial point of discovery signal), which is the duration in which the DRS is transmitted within the DRS transmission period, and may include one or more subframes.

In the example of FIG. 18, in the case that the measurement duration includes a subframe (i.e., in the case of a first measurement duration 1801), the UE calculates the linear average value of the reception power for all REs (R_201) that carry the DRS-CSI-RS in antenna port 201 which is included in the range 1811.

In addition, in the case that the measurement duration includes a plurality of subframes (i.e., in the case of a second measurement duration 1802), the UE may calculate the RSRP in consideration of other subframes. In this case, the UE may calculate the final RSRP by averaging the linear average value of the reception power calculated in each subframe which is included in the measurement duration as the method described above. That is, the UE the linear average value of the reception power for all REs (R_201) which carry the DRS-CSI-RS in antenna port 201 which is included in the range 1812.

For example, in the case that the measurement frequency bandwidth is 6 RBs and the measurement duration corresponds to two subframes, there are total 24 REs which carry the DRS-CSI-RS. Accordingly, the UE may calculate the average value (=the summation of reception power in 24 REs/24) that is measured in total 24 REs.

The procedure for calculating the RSRP is described stage by stage, but the procedure is mere an example for the convenience of description and the present invention is not limited thereto. That is, the RSRP value is calculated based on a single RE unit by taking the average for the reception power value for each RE with respect to the all REs which carry the DRS-CSI-RS for a single antenna port which is included in the measurement frequency bandwidth and the measurement duration.

That is, the RSRP for the DRS-CSI-RS may mean the linear average of the power distribution of the REs which carry the DRS-CSI-RS in the measurement frequency within the subframe of the discovery signal occasion (or the measurement window).

In more particularly, a BS may perform a full power transmission to the REs in which the DRS-CSI-RS in antenna port 201 is transmitted. On the contrary, the case may be occurred that there are two or more antenna ports in which the FB-CSI-RS is transmitted in the corresponding BS in the on-state and the REs in which the FB-CSI-RS is transmitted is overlapped with the RE in which the DRS-CSI-RS is transmitted. In this case, in the overlapped RE, both of the FB-CSI-RS and the DRS-CSI-RS may perform the half power transmission.

However, the UE may measure the power of the REs in antenna port 201 as it is regardless of the operation of BS. And the UE may calculate the average for the DRS-CSI-RS reception power value measured among several subframes which is measured according to the transmission period (or measurement window) of the corresponding DRS-CSI-RS and calculate the RSRP report value, then report it to the BS.

Consequently, it is preferable that the BS maintains the transmission power of antenna port 201 of the corresponding DRS-CSI-RS regardless of whether the corresponding cell is in the on-state or in the off-state such that there is no problem in the UE operation. When there is one antenna port in which the FB-CSI-RS of the corresponding cell is transmitted, it is preferable that the BS may perform the full-power transmission by configuring the DRS-CSI-RS to be one antenna port as above.

In addition, in the case that the measurement timing is set in the UE from the BS (e.g., a measurement duration is set by the BS), it may be assumed that the DRS-CSI-RS is transmitted on each timing. In addition, it may be assumed that the DRS-CSI-RS is transmitted with the same power on each timing. Further, in the case that the antenna port for transmitting the DRS-CSI-RS is set by the BS, it may be assumed that the power of the DRS-CSI-RS transmitted in the corresponding antenna port is the same.

In addition, when calculating the RRM (RSRP, RSRQ and/or RSSI) for a specific cell, the UE may find whether the antenna port for transmitting the DRS-CSI-RS of the corresponding cell is 201 (i.e., one antenna port), or 201 and 202 (i.e., two antenna ports) through the blind detection (BD).

And, in the case that the DRS-CSI-RS is transmitted in antenna port 201 only, the UE measures the RS reception power value for the DRS-CSI-RS transmission RE.

In the example of FIG. 18, the UE may calculate the average value for the reception power measured in all REs (i.e., all REs (R_201) which carry the DRS-CSI-RS included in the range 1811 and the range 1812) which carry the DRS-CSI-RS for antenna port 201 throughout the measurement frequency band within the measurement duration, and report it to the BS.

On the contrary, when the DRS-CSI-RS is transmitted in antenna ports 201 and 202, the UE calculates the reception power value for the DRS-CSI-RS transmission RE for each antenna port, and adds up (or averages) it.

In the example of FIG. 18, each of the DRS-CSI-RSs for antenna ports 201 and 202 is transmitted in the same RE with being CDM. The UE calculates the reception power value for the DRS-CSI-RS transmission RE for each antenna port, and adds up (or averages) it. That is, the UE adds up (or averages) the reception power of the DRS-CSI-RS for antenna port 201 and the reception power of the DRS-CSI-RS for antenna port 202.

Then, the UE may calculate the average value for the reception power measured in all REs which carry the DRS-CSI-RS for antenna ports 201 and 202 throughout the measurement frequency band within the measurement duration (the range 1811 and the range 1812), and report it to the BS.

Here, the measurement values among different subframes are not averaged, but the average may be taken for very short duration. This is for considering that different transmission power is used for the case of transmitting the FB-CSI-RS through a dual antenna port, whereas the DRS-CSI-RS is transmitted through a single antenna port.

In this case, the UE may find whether the antenna port in which the FB-CSI-RS is transmitted is the single antenna port or the dual antenna port through the blind detection or high layer signaling.

As an example of the high layer signaling, the FB-CSI-RS configuration may be used. In this case, the UE is unable to assume that the transmission power of the DRS-CSI-RS is not maintained regularly throughout several subframes, and whether to assume the corresponding assumption may be determined based on the high layer signaling.

Otherwise, when the UE receives the FB-CSI-RS configuration and the configuration for DRS-CSI-RS, the UE may determine whether the FB-CSI-RS and the DRS-CSI-RS are overlapped using the combination of each of the configurations. Since it is hard for the UE to assume such an assumption for a neighbor cell, the UE may perform the operation by assuming that the FB-CSI-RS and the DRS-CSI-RS are overlapped.

(2) In the case that a UE is configured with the number of DRS-CSI-RS transmission antenna ports=2 for each specific frequency (and/or for each cluster), the RSRP measurement operation of UE will be described. In this case, for the convenience of description, it is assumed that antenna port 201 and 202 are configured, and antenna ports 201 and 15 and antenna ports 202 and 16 are in the QCL relation.

When calculating the RSRP for a specific cell, after measuring the RS reception power value for the DRS-CSI-RS transmission REs in antenna ports 201 and 202 of the corresponding cell for each antenna port, the UE may add up (hereinafter, referred to as 'add up power value') the power value measured for each antenna port for each RE, and calculate the RSRP value by averaging the 'add up power value's among different subframes, and then report it to a BS.

FIG. 19 is a diagram for describing a measurement method based on a discovery signal according to an embodiment of the present invention.

Referring to FIG. 19, the respective DRS-CSI-RSs for antenna ports 201 and 202 are transmitted with being CDM to the same RE.

When calculating the RSRP for a specific cell, after measuring the RS reception power value for the DRS-CSI-RS transmission REs in antenna ports 201 and 202 of the corresponding cell for each antenna port, the UE may add up the power value measured for each antenna port for each RE.

And, the UE may calculate the average value for the 'add up power value' calculated in all REs which carry the DRS-CSI-RS for antenna ports 201 and 202 throughout the measurement frequency bandwidth within the measurement duration.

Here, the measurement frequency bandwidth may be the system bandwidth, and also be the DRS transmission bandwidth configured by a BS as described above.

The measurement duration may correspond to the measurement window (or the initial point of discovery signal), which is the duration in which the DRS is transmitted within the DRS transmission period, and may include one or more subframes.

In the example of FIG. 19, in the case that the measurement duration includes a subframe (i.e., in the case of a first measurement duration 1901), the UE calculates the linear average value of the add up power value for all REs (R_201 & R_202) that carry the DRS-CSI-RS in antenna ports 201 and 202 which are included in the range 1911.

In addition, in the case that the measurement duration includes a plurality of subframes (i.e., in the case of a second measurement duration 1902), the UE may calculate the RSRP by averaging again the linear average value of the 'add up power value' measured among different subframes included in the measurement duration and report it to the BS.

The procedure for calculating the RSRP is described stage by stage, but the procedure is mere an example for the convenience of description and the present invention is not limited thereto. That is, the RSRP value is calculated based on a single RE unit by taking the average for the reception power value for each RE with respect to the all REs which carry the DRS-CSI-RS for two antenna ports which are included in the measurement frequency bandwidth and the measurement duration.

When the FB-CSI-RS of the corresponding cell is transmitted in two or more antenna ports, it is preferable for the BS to perform the comparable RSRP report by reporting the RSRP value under the full-power transmission with other (small) cells which take the operation described in (1) above according to the calculation of the "add up power value" of the UE by configuring the DRS-CSI-RS as two ports as described above.

(3) In the case that a UE is configured with the even numbers for the number of DRS-CSI-RS transmission antenna ports=4, 6, . . . and so on for each specific frequency (and/or for each cluster), the RSRP measurement operation of UE will be described.

In this case, for the convenience of description, it is assumed that antenna ports 201 to 204 are configured in the case of four antenna ports, and antenna ports 201 and 15, antenna ports 202 and 16, antenna ports 203 and 17 and antenna ports 204 and 18 are in the QCL relation. So does for six antenna ports and eight antenna ports.

As such, in the case that the number of DRS transmission antenna ports is configured as a unit of even numbers, the description of case (2) above may be generalized for the case that the number of DRS-CSI-RS transmission antenna ports=4, 6, . . . .

That is, a UE performs the RRM report by calculating the 'add up power value' per RE among the antenna ports which are CDM, and/or assuming an average among different UEs, and/or assuming an average among different antenna ports which is not CDM, and/or averaging among subframes. This will be described by reference to the drawing below.

FIG. 20 is a diagram for describing a measurement method based on a discovery signal according to an embodiment of the present invention.

FIG. 20 exemplifies the case that four DRS transmission antenna ports are configured.

Referring to FIG. 20, the respective DRS-CSI-RSs for antenna ports 201 and 202 are transmitted with being CDM to the same RE, and the respective DRS-CSI-RSs for antenna ports 203 and 204 are transmitted with being CDM to the same RE.

When calculating the RSRP for a specific cell, a UE calculates the 'add up power value' for each RE among the antenna ports which are CDM.

For example, after measuring the RS reception power value for the DRS-CSI-RS transmission REs in antenna ports 201 and 202 for each antenna port, the UE may add up the power value measured for each antenna port for each RE. Similarly, after measuring the RS reception power value for the DRS-CSI-RS transmission REs in antenna ports 203 and 204 for each antenna port, the UE may add up the power value measured for each antenna port for each RE.

And, the UE may calculate the average value for the 'add up power value' calculated in all REs which carry the DRS-CSI-RS for antenna ports 201 and 202 throughout the measurement frequency bandwidth within the measurement duration, and calculate the average value for the 'add up power value' calculated in all REs which carry the DRS-CSI-RS for antenna ports 203 and 204, and then calculate again the average value of the calculated average values.

Here, the measurement frequency bandwidth may be the system bandwidth, and also be the DRS transmission bandwidth configured by a BS as described above.

The measurement duration may correspond to the measurement window (or the initial point of discovery signal), which is the duration in which the DRS is transmitted within the DRS transmission period, and may include one or more subframes.

In the example of FIG. 20, in the case that the measurement duration includes a subframe (i.e., in the case of a first measurement duration 2001), the UE calculates the linear average value of the add up power value for all REs (R_201 & R_202) that carry the DRS-CSI-RS in antenna ports 201 and 202 which are included in the range 2011 and all REs (R_203 & R_204) that carry the DRS-CSI-RS in antenna ports 203 and 204.

In addition, in the case that the measurement duration includes a plurality of subframes (i.e., in the case of a second measurement duration 2002), the UE may calculate the RSRP by averaging again the linear average value of the 'add up power value' measured among different subframes included in the measurement duration and report it to the BS.

The procedure for calculating the RSRP is described stage by stage, but the procedure is mere an example for the convenience of description and the present invention is not limited thereto. That is, the RSRP value is calculated based on a single RE unit by taking the average for the reception power value for each RE with respect to the all REs which carry the DRS-CSI-RS for four antenna ports which are included in the measurement frequency bandwidth and the measurement duration.

The reason why the BS configures two or more DRS-CSI-RS transmission antenna ports is to improve the accuracy of the RSRP calculation by providing the DRS-CSI-RS configuration of higher density. Accordingly, the number of DRS-CSI-RS transmission antenna ports that may be configured by the BS is in the form of {2, 4, 6, 8, . . . } or the form of {1, 2, 4, 6, 8, . . . }, and all of the antenna ports may be limited so as to be configured to the UE in a unit of even number of antenna ports.

In addition, by combining and extending the cases (1) and (3), it may be implemented that the odd numbers such as 3, 5, and the like may also be configured as the number of DRS-CSI-RS transmission antenna ports that may be configured by the BS.

In this case, the "add up power value" is calculated among the antenna ports which are CDM, and the RS reception power value of the corresponding antenna port is measured like the case (1) for a single antenna port which is not CDM. And, the average value may be calculated by taking the average of the "add up power value" calculated in the RE which carries the DRS-CSI-RS for the antenna port which is CDM throughout the measurement frequency bandwidth within the measurement duration and the reception power value measured in the RE which carries the DRS-CSI-RS for the antenna port which is not CDM.

In addition, in the case that the measurement duration includes a plurality of subframes, the UE may calculate the RSRP by averaging again the linear average values which are measured among different subframes, and may report it to the BS.

Meanwhile, the number of DRS-CSI-RS transmission antenna ports (and/or antenna port number) may be predetermined by a fixed value, not configured by a BS.

That is, it may be predetermined such that the DRS-CSI-RS measures the RSRP (and/or RSRQ) only with a single antenna port (e.g., antenna port 201 or 15). In this case, the operation of UE may be defined and configured as the same as the case (1) described above.

When measuring the RSRP for a specific cell, a UE measures the RS reception power value for the REs which carry the DRS-CSI-RS of the antenna port (e.g., 201 or 15) that is preconfigured throughout the measurement frequency bandwidth within a measurement duration.

Here, the measurement frequency bandwidth may be the system bandwidth, and also be the DRS transmission bandwidth configured by a BS as described above.

The measurement duration may correspond to the measurement window (or the initial point of discovery signal), which is the duration in which the DRS is transmitted within the DRS transmission period, and may include one or more subframes.

In addition, in the case that the measurement duration includes a plurality of subframes, the UE may calculate the RSRP by averaging the RS reception power values which are measured among different subframes, and may report it to the BS.

That is, the RSRP for the DRS-CSI-RS may mean the linear average of the power distribution of the REs which carry the DRS-CSI-RS in the measurement frequency in the subframe of the discovery signal occasion (or measurement window) which is configured.

In addition, the DRS-CSI-RS may be predetermined so as to measure the RSRP (and/or RSRQ) only with two antenna ports (e.g., antenna ports 201 and 202, or 15 and 16).

In this case the operation of UE may be defined and configured similar to the case (2) described above.

When calculating the RSRP for a specific cell, after measuring the RS reception power value for the DRS-CSI-RS transmission REs in antenna ports 201 and 202 of the corresponding cell for each antenna port, the UE may calculate the add up the power value by adding up the reception power value measured for each antenna port for each RE.

And, the UE may calculate the average value for the 'add up power value' calculated in all REs which carry the DRS-CSI-RS for antenna ports 201 and 202 throughout the measurement frequency bandwidth within the measurement duration.

In addition, in the case that the measurement duration includes a plurality of subframes, the UE may calculate the RSRP by averaging again the linear average values for the 'add up power value' which are measured among different subframes, and may report it to the BS.

In this case, since the DRS-CSI-RS is fixed with two transmission antenna ports always, in the case that the BS transmits using only antenna port 201 (e.g., 1-Tx BS, etc.), only interference and noise component is calculated for the reception power for antenna port 202 of the UE, and this may be added up (or averaged) with the reception power of antenna port 201.

However, this is not an abnormal UE operation, but the UE adds up (or averages) the reception power values per each antenna port regardless of the presence of antenna port 202. With respect to the RRM report result reported by adding up the interference and noise component by the UE operation, when the BS knows the number of transmission antenna ports of the cell that transmits the corresponding DRS (e.g., when the BS knows a single antenna port 201), the BS may apply it to the cell association by interpreting the RRM report result (e.g., by amending the reported RSRP value by taking two folded value so as to be compared with other values) and by comparing it with the RRM report result for other cell.

Otherwise, for such a case, the UE takes adding up (or averaging) only when the reception from antenna port 202 is detected. When the reception is detected from antenna port 201 only, the UE may report the RSRP for antenna port 201 only to the BS or report the result which is doubling the RSRP value that corresponds to antenna port 201.

FIG. 21 is a diagram illustrating a method for performing a measurement according to an embodiment of the present invention.

FIG. 21, the CSI-RS may be used as the discovery signal as described above, or the discovery signal may be separately defined from the existing CSI-RS, although it is similar to the CSI-RS configuration.

Referring to FIG. 21, a UE may receive the information of the number transmission antenna ports of the discovery signal which is transmitted from each of the TPs (TP 2, TP 3, . . . , TP n) from a serving eNB (TP 1) (step, S2101).

Here, the number of antenna ports in which the discovery signal is transmitted may be configured for each frequency or for each cluster. In FIG. 21, TP 1 to TP n may mean the TPs included in a cluster.

However, the number of antenna ports in which the discovery signal is transmitted may be predetermined and fixed, in this case, step, S2101 may be omitted.

The UE may receive the system bandwidth information for each frequency (and/or for each cluster) or the bandwidth information in which the discovery signal is transmitted from the serving eNB (TP 1) (step, S2102).

However, the bandwidth in which the discovery signal is transmitted may be predetermined and fixed, in this case, step, S2102 may also be omitted.

The UE receives the discovery signal from each of the TPs (step, S2103), and performs a measurement based on the received discovery signal (step, S2104).

Here, in case that the DRS is comprised of the PSS/SSS and the CRS, the UE may measure the RRM by using the CRS, or measure the RRM by using the PSS/SSS, the CRS and the CSI-RS (i.e., the DRS-CSI-RS).

While the UE is connected with the serving eNB, the UE performs the measurement by receiving the discovery signal which is periodically transmitted from TPs (TP 2 to TP n), which is not the serving eNB, as well as from the serving eNB.

The UE determines the RSRP as the average value of the reception power in the RE which carries the discovery signal. The UE may determine the RSRP as the average value of the reception power in the RE which carries the discovery signal belonged to the measurement duration within the measurement bandwidth. In this case, the number of REs that is used for determining the RSRP may be determined by the UE.

In this case, in the case that the discovery signal for different antenna ports is transmitted with being Code Division Multiplexed (CDM) in the same RE, the reception power may be determined as the summation of the reception power which is CDM (i.e., 'add up power value') in the RE in which the discovery signal which is CDM is transmitted. And, the RSRP may be determined as the average of the 'add up power value' in each RE.

In the case that the discovery signal for different antenna ports is transmitted with being CDM and the discovery signal for other antenna port is transmitted, the RSRP may be determined as the average value of the reception power in the RE in which the discovery signal which is CDM is transmitted and the reception power in the RE in which the discovery signal for other antenna port is transmitted.

In addition, in the case that the measurement duration for measuring the RSRP includes a plurality of subframes, the RSRP may be determined as the average value of the average values of the reception powers calculated for each subframe included in the measurement duration.

The RSRQ may be determined based on the RSRP which is determined as such.

The UE reports the result of RSRP and/or RSRQ measured in step, S2103 to the eNB (step, S2105).

DRS Configuration

As described above, small-cell enhancement technologies have been discussed through 3GPP LTE Rel-12 standardization, and representatively a small cell discover signal (i.e., DRS) is defined. When considering that the small cell performs on/off operation, the DRS is always transmitted at regular intervals so that the UE can perform the RRM report (e.g., RSRP, RSRQ, etc.) irrespective of on/off of the cell.

The DRS measurement timing configuration (DMTC) may be set per frequency (i.e., carrier frequency) in the UE by the upper layer signaling (e.g., RRC signaling, i.e., MeasDS-Config IE (information element). This may be called a DRS configuration (or DRS measurement configuration) and means information applicable for DRS measurement. For example, MeasDS-Config IE (information element) may be used to be provided to the UE.

DRS configuration includes the following information per frequency.

DMTC periodicity and offset (e.g., upper layer parameter "dmtc-PeriodOffset")

DRS occasion duration (e.g., upper layer parameter "ds-OccasionDuration")

CSI-RS (i.e., DRS-CSI-RS) resource information (e.g., upper layer parameter "MeasCSI-RS-Config")

The DMTC period and offset indicate the DMTC period and MDTC offset in the corresponding frequency (e.g., (component) carrier, cell or frequency band). For example, the DMTC period may correspond to 40, 80 and 160 ms. The value of the DMTC offset may be indicated by the number of subframe(s). The DMTC duration may mean a duration for monitoring the DRS by the UE, and, for example, may be fixed in advance like 6 ms. The DMTC duration may be also called DMTC occasion, DRS search window, or the like (hereinafter, referred to as "DMTC duration").

Cell-specific DRS occasions may be respectively set for a plurality of (small) cells in the corresponding frequency per DMTC duration. The DRS occasion means the subframe in which the DRS is actually transmitted in the corresponding cell.

The DRS occasion duration indicates the duration of the DRM occasion in the corresponding frequency (e.g., (component) carrier, cell or frequency band). The DRS occasion duration may be common to all cells in which the DRS is transmitted in one frequency.

CSI-RS resource information includes a subframe offset indicating a relative subframe offset between the SSS transmission subframe and CSI-RS transmission subframe within the DRS occasion of the cell indicated by a physical cell ID, a scrambling ID, CSI-RS configuration, and a physical cell ID of a cell which becomes the subject of DRS measurement.

The UE sets up DMTC according to the received dmtc-PeriodOffset. Namely, the first subframe of the DMTC duration corresponds to the system frame number (SFN) and subframe of P cell satisfying Equation 21 below.

$$\text{SFN mod } T = \text{FLOOR}(\text{dmtc-Offset}/10)$$

$$\text{subframe} = \text{dmtc-Offset mod } 10 \qquad \text{[Equation 21]}$$

In Equation 21, T means dmtc-Periodicity/10. FLOOR (x) draws the maximum integer smaller than or equal to x.

The UE does not consider DRS transmission in the subframe other than the DMTC duration on the corresponding frequency.

Further, the UE can assume the DRS occasion of one time in every DMTC periodicity ("dmtc-Periodicity").

In the case of frame structure type 1, DRS occasion for the cell may be configured with one continuous subframe occasion among {1, 2, 3, 4, 5 ms}. Further, in the case of frame structure type 2, the DRS occasion for the cell is configured with one continuous subframe occasion among {2, 3, 4, 5 ms}.

The types of the DRS include PSS/SSS, CRS (i.e., DRS-CRS), and CSI-RS. Namely, the DRS may be configured with PSS/SSS and DRS-CRS or may be configured with PSS/SSS, CRS, and CSI-RS.

The UE may assume the existence of DRS configured as follows in the DL subframe within the DRS occasion.

Cell-specific reference signal (i.e., CRS) of antenna port 0 within all DL subframes, and within the DwPTC of all special subframes within the DRS occasion.

PSS in the first subframe at DRS occasion for frame structure type 1 or in the second subframe at DRS occasion for frame structure type 2

SSS within first subframe of DRS occasion

NZP CSI-RS within 0 (i.e., non-existence), or one or more subframes within the DMTC periodicity Likewise, SSS is always defined as being transmitted in the first subframe in the DRS occasion duration, and thus the UE can know the starting location (i.e., subframe in which the SSS is transmitted) of the DRS occasion by detecting the SSS within the DMTC duration. Namely, the UE can assume that SSS is always to be received in the first subframe of a specific DRS occasion duration. Hence, the UE can assume that the corresponding first subframe is always non-MBSFN (Multicast Broadcast Single Frequency Network) and detect and measure the CRS by recognizing the number of CRS Res in the corresponding subframe based on the assumption.

Further, as described above, when the CSI-RS is used as the DRS, the UE can detect and measure CSI-RS by recognizing the transmission subframe occasion of the CSI-RS through relative offset information with the transmission subframe of the SSS within the DRS occasion.

In the carrier frequency in which the UE may be used for S cell, if RRM measurement based on DRS is configured, the S cell is deactivated, and the UE is not configured by the upper layer not to receive MBMS (Multimedia Broadcast Multicast Service) in the corresponding S cell, the UE can assume that PSS, SSS, PBCH, CRS, PCFICH, PDSCH, PDCCH, EPDCCH(enhanced-PDCCH), PHICH, DMRS and CSI-RS are not transmitted to the S cell except for DRS transmission to the subframe in which the activation command has been received for the corresponding S cell from the eNB.

Hereinafter, the CRS, which is transmitted within the DRS occasion, is referred to as DRS-CRS in order to be distinguished from the previously-defined CRS, and the previously-defined CRS is referred to as legacy CRS. Further, the CSI-RS, which is transmitted within the DRS occasion, is referred to as DRS-CSI-RS in order to be distinguished from the previously-defined CSI-RS, and the previously-defined CSI-RS is referred to as legacy CSI-RS.

Number of Antenna Ports

DRS-CRS and/or DRS-CSI-RS for a plurality of antenna ports may be used for measurement of the UE within the DRS occasion. To this end, the number of antenna ports per cell/frequency for DRS-CRS and/or DRS-CSI-RS may be provided to the UE as in operation S2101 of FIG. 21.

The UE may improve the detection performance of the corresponding reference signal by using the information on the number of the DRS-CRS and/or DRS-CSI-RS antenna ports. For example, if the number of DRS-CRS ports is indicated as 2, the UE may perform measurement by using both R0 and R1 ports.

In this regard, more details will be considered with reference to the drawings below.

Hereinafter, in the description of the present invention, the existing CRS-based RRM measuring operation and the DRS-based RRM measuring operation in the DRS occasion were used as the example for the convenience of description, but the present invention is not limited thereto. Namely, the technical feature of the present invention may be used in the same manner in the previously-defined reference signal-based RRM measuring operation and a newly defined reference signal-based RRM measuring operation (i.e., enhanced RRM measurement).

FIG. 22 illustrates a method of performing measurement according to an embodiment of the present invention.

As described above, in FIG. 22, TP may be understood as a term representing an eNB, MeNB, SeNB, TP, RP, RRH, relay or the like. Further, the TP may service one or more cells. Further, one or more TPs may use the same physical cell identifier (PCID) or different physical cell identifiers for respective TPs.

Referring to FIG. 22(a), the UE receives information on the number of legacy CRS antenna ports per TP (or per frequency or per cell) from the serving eNB (or TP 1) (S2211).

For example, the number of CRS antenna ports may be transmitted to the UE using the parameter such as the previously defined "PresenceAntennaPort1".

"PresenceAntennaPort1" is used to indicate whether R1 port is used to indicate whether all neighbor cells use R1 port for the legacy CRS. If "PresenceAntennaPort1" is set to True, using antenna port R1 is directed, and if "PresenceAntennaPort1" is set to False, not using antenna port R1 is directed. If "PresenceAntennaPort1" is set to True (i.e., antenna port 1 is used), the UE can assume that at least two legacy CRS antenna ports (R0 and R1) are used in all neighbor cells.

PresenceAntennaPort1" can be transmitted through an upper layer signaling.

For example, "PresenceAntennaPort1" may be included in system information (e.g., system information block (SIB) type 3 (hereinafter, simply referred to as "SIB x")) and transmitted.

SIB 3 includes intra-frequency cell reselection information in addition to information related to neighbor cells as well intra-frequency, inter-frequency, and/or inter-RAT radio access technology) common cell reselection information (i.e., applicable to one or more types of cell reselection, but not necessarily all types).

SIB 5 includes only related information for only inter-frequency cell reselection (i.e., information related to other E-UTRA frequency and inter-frequency neighbor cell(s) for cell reselection). Further, SIB 5 includes a cell-specific parameter as well as a common cell reselection parameter for one frequency.

Further, "PresenceAntennaPort1" may be included in "MeasObjectEUTRA", which is IE applicable to measurement of intra-frequency or inter-frequency E-UTRAN cell, and be transmitted through an RRC connection reconfiguration message.

The RRC connection reconfiguration message is a command for changing RRC connection. This message may include a measurement configuration, a mobility control, a related dedicated NAS information radio resource configuration (including RBs, MAC main configuration and physical channel configuration) and security configuration.

The UE receives a discovery signal (i.e., a DRS-CRS) from respective TPs (S2212).

Namely, the UE receives a DRS-CRS in the subframe where the DRS occasion has been configured within the DMTC occasion.

The UE performs measurement based on DRS-CRS by assuming the number of DRS-CRS antenna ports according to information on the number of legacy CRS antenna ports (S2213).

Namely, the operation of the UE may be defined or configured so that the signaling of "PresenceAntennaPort1", which is the existing parameter for indicating whether R1 port can be measured for the legacy CRS, may also be applied together as the signaling for directly indicating whether the corresponding DRS-CRS R1 port may be measured for DRS-CRS.

For example, if the "PresenceAntennaPort1" is indicated as True, it may mean that the UE can measure R1 port as well as R0 port in the case of DRS-CRS during the DMTC duration (or DRS occasion). Further, it may mean that R1 port should also be measured as well as R0 port.

Hence, the UE can (or should) use DRS-CRS R1 port as well as DRS-CRS R0 port in order to determine RSRP in measuring RSRP based on the DRS-CRS.

Likewise, if DRS-CRS R1 port is measured together, the measurement performance can be enhanced by the combination through the measurement result of DRS-CRS R0 port and the operation of average, etc.

On the other hand, if "PresenceAntennaPort1" is indicated as False, even if it is determined that the UE has detected R1 as well as R0 for the legacy CRS, it should not be assumed that R1 port is transmitted in the DRS-CRS. Hence, the UE should separately determine that, for example, in the directed DMTC duration, R1 port is detected in the DRS-CRS.

Hence, when measuring RSRP based on DRS-CRS, the UE uses DRS-CRS R0 port in order to determine RSRP. At this time, if DRS-CRS R1 port is reliably detected in the UE, the UE can use DRS-CRS R1 port as well as DRS-CRS R0 in order to determine RSRP.

The UE determines RSRP as the average value of the receiving power in the RE which carries DRS-CRS. The UE can determine RSRP as the average value of the receiving power in the RE carrying DRS-CRS belonging to the measurement duration within the measuring bandwidth. At this time, the number of REs used to determine RSRP may be determined by the UE.

Further, when the measurement duration for measuring the RSRP is configured with a plurality of subframes, the RSRP may be determined as the average value of average values of the receiving powers which are calculated for respective subframes included in the measurement duration.

RSRQ may be determined based on such a determined RSRP.

The UE reports the RSRP and/or RSRQ result measured in step 2213 to the eNB (S2214).

As described above, the above described method may be used in the same manner in the existing RRM measurement operation and the enhanced RRM measurement operation. For example, information on the number of antenna ports of the reference signal for the reference signal for the enhanced RRM measurement operation may be drawn based on the number of antenna ports of the reference signal for the existing RRM measurement. Namely, the UE can assume the number of antenna ports of the reference signal for the enhanced RRM measurement operation using information on the number of antenna ports of the reference signal for the existing RRM measurement.

Meanwhile, the UE may not consider any correlation between the number of measurable antenna ports of the legacy CRS and the number of measurable antenna ports of the DRS-CRS. Namely, the number of CRS antenna ports may not be applied to the DRS-based measurement. Hence, the above-described "PresenceAntennaPort1" parameter may not be applied to the frequency/cell in which the DRS measurement has been configured. In other words, "PresenceAntennaPort1" parameter may be applied only to the frequency/cell in which the CRS measurement has been configured.

As such, in an embodiment of the present invention, a separate, independent parameter (e.g., "PresenceAntennaPort1DRS-CRS") may be defined as well as "PresenceAntennaPort1" may be defined for the DRS-CRS so as to be signaled to the UE.

Referring to FIG. 22(b), the UE receives information on the number of DRS-CRS antenna ports per TP (i.e., per frequency or per cell) from the serving eNB (or TP 1).

For example, the number of DRS-CRS antenna ports may be indicated as newly defined "PresenceAntennaPort1DRS-CRS" parameter. "PresenceAntennaPort1DRS-CRS" parameter may be used to indicate whether R1 port is used in the DRS-CRS. If "PresenceAntennaPort1DRS-CRS" is set to True, using antenna port R1 is directed, and if "PresenceAntennaPort1DRS-CRS" is set to False, not using antenna port R1 may be directed. If "PresenceAntennaPort1DRS-CRS" is set to True, it may be assumed that at least two DRS-CRS antenna ports R0 and R1 are used in the neighbor cell.

"PresenceAntennaPort1DRS-CRS" parameter may be transmitted to the UE through an upper layer signaling (e.g., an RRC signaling). For example, the parameter may be included in system information so as to be transmitted or may be included in DRS configuration so as to be transmitted through RRC connection reconfiguration message, etc.

The UE receives a discovery signal from each TP (S2222).

Namely, the UE receives a discovery signal in the subframe in which DRS occasion has been set in the DMTC duration.

The UE assumes the number of DRS-CRS antenna ports according to information on the number of DRS-CRS antenna ports so as to perform measurement based on the DRS-CRS (S2223).

Meanwhile, though not illustrated in FIG. 22, the UE can receive information on the number of antenna ports for the legacy CRS for RRM measurement based on legacy CRS per TP (i.e., per frequency or per cell).

In this case, as described above, the number of antenna ports is indicated as a parameter such as the previously defined "PresenceAntennaPort1", and "PresenceAntennaPort1" may be transmitted to the UE through an upper layer signaling as described above.

Likewise, when independent parameters (e.g., "PresenceAntennaPort1" and "PresenceAntennaPort1DRS-CRS") are provided for the legacy CRS and DRS-CRS, respectively, the UE should not consider any correlation between the number of measurable antenna ports of the legacy CRS and the number of measurable antenna ports of the DRS-CRS.

For example, when a signaling is provided in the form of "PresenceAntennaPort1"="False" and "PresenceAntennaPort1DRS-CRS"="False", even if the UE determines that R1 port (i.e., DRS-CRS for R1 port) as well as R0 port (i.e., DRS-CRS for R0 port) has been detected for the legacy CRS, it should not be assumed that R1 port (i.e., DRS-CRS for R1 port) is promptly transmitted for the DRS-CRS. For example, the UE should separately determine that R1 port (i.e., DRS-CRS for R1 port) is detected in the DRS-CRS itself in the directed DMTC duration.

Hence, when measuring RSRP based on DRS-CRS, the UE uses DRS-CRS R0 port (i.e., DRS-CRS for R0 port) in order to determine RSRP. At this time, if DRS-CRS R1 port is reliably detected in the UE, the UE can use DRS-CRS R1 port (i.e., DRS-CRS for R1 port) as well as DRS-CRS R0 (i.e., DRS-CRS for R0 port) in order to determine RSRP.

As another example, when a signaling is provided in the form of "PresenceAntennaPort1"="True" and "PresenceAntennaPort1DRS-CRS"="False", even if a signaling capable of measuring R1 port for the legacy CRS has been received, it cannot be determined that the UE can measure R1 port in the DRS-CRS by analogy through the signaling. Namely, even in this case, for example, it should be separately determined whether R1 port (i.e., DRS-CRS for R1 port) is detected in the DRS-CRS in the directed DMTC duration.

Hence, when measuring RSRP based on DRS-CRS, the UE uses DRS-CRS Cport (i.e., DRS-CRS for R0 port) in order to determine RSRP. At this time, if DRS-CRS R1 port is reliably detected in the UE, the UE can use DRS-CRS R1 port (i.e., DRS-CRS for R1 port) as well as DRS-CRS R0 (i.e., DRS-CRS for R0 port) in order to determine RSRP.

As another example, when a signaling is provided in the form of "PresenceAntennaPort1"="False" and "PresenceAntennaPort1DRS-CRS"="True", even if a signaling capable of measuring R1 port for the DRS-CRS has been received, it cannot be determined that the UE can measure R1 port in the legacy CRS by analogy through the signaling. Namely, even in this case, for example, it should be separately determined whether R1 port (i.e., DRS-CRS for R1 port) is detected in the legacy CRS itself Hence, when measuring RSRP based on DRS-CRS, the UE can use (or should use) DRS-CRS R1 port (i.e., DRS-CRS for R1 port) as well as DRS-CRS R0 port (i.e., DRS-CRS for R0 port) in order to determine RSRP.

The UE determines RSRP as the average value of the receiving power in the RE carrying DRS-CRS. The UE can determine RSRP as RSRP as the average value of the receiving power in the RE carrying the discovery signal belonging to the measurement duration within the measurement bandwidth. At this time, the number of REs used to determine RSRP can be determined by the UE.

Further, when the measurement duration for measuring RSRP is configured with a plurality of subframes, the RSRP may be determined as the average value of the average values of the receiving power which is calculated for each subframe included in the measurement duration.

The RSRQ can be determined based on the RSRP.

The UE reports RSRP and/or RSRQ result measured in S2223 to the eNB (S2224).

As described above, the above described method may be applied in the same manner in the existing RRM measurement operation and the enhanced RRM measurement operation. For example, no correlation between the number of antenna ports of the reference signal for the existing RRM measurement and the antenna ports of the reference number for the enhanced RRM measurement operation may be considered. For example, the above-described "PresenceAntennaPort1" parameter or CSI-RS configuration is not applied to the frequency/cell in which the enhanced RRM measurement has been configured.

Meanwhile, unlike the illustration of FIG. 22(b), DRS-CRS port (e.g., DRS port number information) may not be indicated to the UE. Namely, step S2221 of FIG. 22(b) may be omitted.

Likewise, if the DRS-CRS port is not indicated to the UE, clarification is needed in aspect of DRS-CRS transmission and UE operation.

According to the standard for CRS-based RSRP measurement, if CRS antenna port R1 is reliably detected, the UE can use CRS port R0 and CRS port R1.

With respect to DRS-CRS-based RSRP measurement, it can be defined as the above. According to the definition, when the cell is at the on-state, it is necessary to assume that both DRS-CRS and CRS use antenna port R1.

The DRS occasion may be generated in the on-state, and thus the UE has a possibility of reading DRS-CRS transmitted at the off-state and reading CRS transmitted at the on-state. Hence, if the cell uses antenna port R1 at the on-state, in order to enable the detection of the reliable UE in antenna port R1, DRS-CRS should also use antenna port R1 irrespective of the cell state.

If the DRS-CRS and CRS differently use antenna port R1 at the on-state, the UE recognizes the existence of legacy CRS antenna port R1, and thus in this case, antenna port R1 for DRS-CRS can be measured, which can cause the significant performance loss.

Hence, when DRS-CRS and CRS differently use antenna port R1 at the on-state, in order to enable CRS port 0 for only DRS-CRS, RSRP measurement needs to be limited to DRS-CRS port 0 in order to avoid performance degradation. Namely, only CRS port 0 may be used by restriction for DRS-based measurement.

Restricted RRM Measurements

When time domain ICIC (inter-cell interference coordination) is applied, interference levels of two types of subframes (e.g., protected subframe and non-protected subframe) are significantly different, and thus the difference may significantly affect the measurement result of the UE. Hence, the eNB may set restricted measurement to the UE in order to restrict the measurement of the UE at a specific point of time.

For such a restricted measurement, the eNB signals the restricted resource pattern to the UE. For example, in order to specify a subframe pattern for the restricted measurement, upper layer parameter "measSubframePatternNeigh" may be used. The "measSubframePatternNeigh" parameter is the time domain measurement resource restriction pattern applicable to the measurement of RSRP and RSRQ of a neighbor cell on the carrier frequency. For example, "measSubframePatternNeigh" may be configured with a 40-bit bitmap in which the location of the first/leftmost bit indicates the first subframe and, sequentially, the location of the next bit indicates the next subframe. In the corresponding bitmap, "1" indicates that the corresponding subframe is used for the restricted measurement.

Likewise, when the measurement resource restriction pattern is configured for the RRM measurement for the neighbor cell, physical cell ID list of each neighbor cell is also provided to the UE. For example, the "measSubframeCellList", which is an upper layer parameter indicating the list of the cell to which "meansSubframePatternNeigh" is applied, may be used.

With respect to the cell within "measSubframeCellList", the UE may assume that subframes indicated by "measSubframePatternNeigh" are non-MBSFN subframes.

The above-described "measSubframeCellList" and "measSubframePatternNeigh" may be included in "MeasObjectEUTRA" so as to be transmitted to the UE through RRC connection reconfiguration message.

In the UE, restricted measurement is applied only to the listed cell and general measurement is applied to other cells. This is for not applying unnecessary restricted measurement to neighbor cells in which the interference is not a problem and for applying restricted measurement to neighbor cells in which the interference is a problem.

Further, referring to CSI measurement, the UE averages the channel and interference estimation result over a plurality of subframes in order to draw CSI feedback. In order not to average the interferences over two different subframe types, the eNB may configure 2 subframe sets, and the subframe sets may be configured so that the UE averages channel and interference over the subframe belonging to one subframe set and does not average the channel and interference with other subframe sets. Further, the UE reports a separate CSI measurement for two subframe sets. The UE may periodically report CSI measurement according to the report period which is set for each subframe set or may report one of CSI measures for two subframe sets through PUSCH when triggered by PDCCH.

If the direction of restricted measurement is configured, the UE needs to classify whether the restricted measurement in the DRS is also applied. Namely, it should be clarified whether restricted measurement is applied in the same manner in the DMTC duration (or DRS occasion).

Hereinafter, RRM measurement is assumed for the convenience of description, but the technical feature of the present invention is not limited thereto. For example, with respect to the DRS-CSI measurement, the UE may draw CSI feedback per subframe set so as to be reported to the eNB, and in such a case, the technical feature of the present invention may be applied in the same manner.

FIG. 23 illustrates a measurement method according to an embodiment of the present invention.

As described above, in FIG. 23, TP may be understood as a term representing an eNB, MeNB, SeNB, TP, RP, RRH, relay or the like. Further, the TP may service one or more cells. Further, one or more TPs may use the same physical cell identifier (PCID) or different physical cell identifiers for respective TPs.

Referring to FIG. 23(a), the UE receives a subframe pattern for CRS-based restricted measurement and a cell list to which the corresponding subframe pattern is applied from a serving eNB (or TP 1) (S2311).

Namely, in order to clarify whether the CRS-based restricted measurement may be applied to the DRS-based measurement in the same manner, for example, the previously defined "measSubframePatternNeigh" and "measSubframeCellList" may be used.

The UE receives a discovery signal (i.e., DRS) from each TP (S2312).

The UE performs a discovery signal based measurement in the subframe which is indicted in the subframe pattern for the CRS-based restricted measurement within the DMTC duration (or DRS occasion) for the cell indicated in the cell list to which the subframe pattern is applied (S2313).

Namely, the UE measures DRS-based RSRP and/or RSRQ in the subframe in which the subframe pattern for restricted measurement, which is received in S2311, is overlapped.

The UE determines RSRP as the average value of the receiving power in the RE carrying DRS. In the RE carrying the DRS belonging to the measurement duration within the measurement bandwidth, RSRP may be determined as the average value of the receiving power. At this time, the number of REs used to determine RSRP may be determined by the UE.

Further, when the measurement duration for measuring the RSRP is configured with a plurality of subframes, the RSRP may be determined as the average value of average values of the receiving power which is calculated per subframe that is included in the measurement duration.

Likewise, RSRQ may be determined based on the determined RSRP.

The UE reports RSRP and/or RSRQ result measured in step S2313 to the eNB (S2314).

Further, a new separate format indicating the subframe pattern for DRS-based restricted measurement within the DMTC duration (or DRS occasion) may be defined so as to be configured in the UE. Hereinafter, an upper layer parameter indicating a measurement subframe pattern in the DMTC is called "measSubframePatternNeighDRS". Further, the upper layer parameter indicating a cell to which "measSubframePatternNeighDRS" is applied is called "measSubframeCellListDRS".

Referring to FIG. 23(b), the UE receives a subframe pattern (e.g., "measSubframePatternNeighDRS") for DRS-based restricted measurement within DMTC duration (or DRS occasion) and a cell list ("measSubframeCellListDRS") to which the corresponding subframe pattern is applied, from the serving eNB (or TP 1) (S2321).

The "measSubframePatternNeighDRS" may be defined in the form of a specific subframe bitmap (e.g. a 5 ms subframe bitmap) corresponding to DMTC duration (e.g., 5 ms) so as to provide restricted measurement subframe pattern information for the DRS-based measurement. In the "measSubframePatternNeighDRS", the first/leftmost bit location indicates the first subframe, sequentially the next bit location may indicate the next subframe, and in the corresponding bitmap, "1" may indicate that the subframe is used for restricted measurement.

Further, the UE may enable this information to be applied to only DRS-based measurement.

Further, such a short subframe bitmap form (i.e.,measSubframePatternNeighDRS) may be coupled with a short subframe bitmap form indicating whether the subframe belonging to the DMTC duration (or DRS occasion) is MBSFN subframe in a joint-encoded manner so as to provide a signaling.

The UE receives a discovery signal (i.e., DRS-CRS and/or DRS-CSI-RS) from each TP (S2322).

The UE performs measurement based on a discovery signal in the subframe indicated in the subframe pattern form restricted measurement within the DMTC duration (or DRS occasion) for the cell indicated in the cell list to which the subframe pattern is applied (S2323).

Namely, the UE measures DRS-based RSRP and/or RSRQ in the subframe indicated in the subframe pattern for restricted measurement within the DMTC duration (or DRS occasion) received in S2321 within the DMTC duration (or DRS occasion).

The UE determines RSRP as the average value of the receiving power in the RE carrying DRS. The UE can determine RSRP as the average value of the receiving power in the RE carrying DRS belonging to the measurement duration within the measurement bandwidth. At this time, the number of RE used to determine RSRP may be determined by the UE.

Further, when the measurement duration for measuring RSRP is configured with a plurality of subframes, the RSRP may be determined as the average value of average values of the receiving power which is calculated per subframe which is included in the measurement duration.

The RSRQ may be determined such a determined RSRP.

The UE reports RSRP and/or RSRQ result measured in operation S2323 to the base station (S2324).

Further, as shown in FIG. 23(b), when"measSubframePatternNeighDRS" and "measSubframeCellListDRS" are provided as a parameter separately from the existing "measSubframePatternNeigh" and "measSubframeCellList", if there is no cell-ID overlapping between cell IDs belonging to "measSubframeCellList" and "measSubframeCellListDRS", a problematic situation does not occur. Namely, the UE may perform restricted measurement according to the corresponding "measSubframePatternNeigh" information while recognizing cell-ID belonging to the existing legacy operation as legacy CRS and may perform restricted measurement according to the separate "measSubframePatternNeighDRS" for cell-IDs belonging to "measSubframeCellListDRS" which is separately provided for DRS.

However, the operation of the UE when specific cell-ID A is overlapped at "measSubframeCellList" and "measSubframeCellListDRS" needs to be defined or configured in the UE.

Hereinafter, the case that only one cell-ID A is overlapped is assumed for the convenience of description, but when there are a multiple of overlapped cell-IDs such as B, C and the like, the operation below may be applied to each cell ID in the same manner.

1) As an embodiment of the present invention, overlapped cell-ID A may be defined or configured in the UE to perform only DRS-based restricted measurement.

For example, the UE detects and measures DRS which is generated as the corresponding cell-ID A within only the indicated DMTC duration (or DRS occasion) and may perform DRS-based restricted measurement according to "measSubframePatternNeighDRS".

Namely, the UE may disregard the existing "measSubframePatternNeigh and may not perform CRS-based restricted measurement for overlapped cell-ID. In other words, the UE may give a higher priority to DRS-based restricted measurement in the overlapped cell-ID A and may perform DRS-based restricted measurement in the subframe indicated in "measSubframePatternNeighDRS" in the indicated DMTC duration (or DRS occasion).

Likewise, the UE may discovery more (small) cells within the communication range by giving a higher priority to the DRS-based restricted measurement, through which an optimal cell to the corresponding UE may be efficiently selected.

The above-described method may be used in the restricted RRM measurement operation and enhanced restricted RRM measurement operation in the same manner. Namely, when the subframe pattern for enhanced restricted RRM measurement and the cell list to which the corresponding subframe pattern is applied are provided to the UE, if the cell to which "measSubframePatternNeigh" is applied and the cell to which the subframe pattern for enhanced restricted RRM measurement is applied are overlapped, the above same method may be applied.

Namely, the UE may disregard "measSubframePatternNeigh" and may not perform CRS-based restricted RRM measurement operation for the corresponding overlapped cell. In other words, the UE may give a higher priority to enhanced restricted RRM measurement operation in the corresponding overlapped cell and perform only enhanced restricted RRM measurement in the subframe pattern for enhanced RRM measurement.

Further, as another example, when the cell to which the subframe pattern for the existing restricted RRM measurement (M1) is applied, the cell to which the subframe pattern for DRS-based restricted RRM measurement (M2) is applied, and the cell to which the subframe pattern for the enhanced restricted RRM measurement (M3) is applied are overlapped, the UE gives the highest priority to M3, then gives the second highest priority to M2, then gives the lowest priority to M1. Namely, when the cell to which M3 is applied overlaps with the cell to which M2 and/or M1 is applied, the UE may perform only M3 for the overlapped cell. Further, when the cell to which M2 is applied overlaps with the cell to which M1 is applied, the UE may perform only M2 for the overlapped cell.

2) As another embodiment of the present invention, overlapped cell-ID A may be defined or configured in the UE to be handled and operated as legacy CRS. Namely, the UE may be defined or configured to perform only CRS-based restricted measurement for overlapped cell-ID A.

For example, restricted measurement according to "measSubframeCellList" may be performed.

Namely, the UE may disregard DRS-based "measSubframePatternNeighDRS" and may not perform DRS-based restricted measurement with respect to the overlapped cell-ID A. In other words, the UE may give a higher priority to CRS-based restricted measurement and may perform only CRS-based restricted measurement in the subframe indicated in "measSubframePatternNeigh" in the overlapped cell-ID A.

Likewise, the time domain ICIC between adjacent cells may be stably applied irrespective of the on/off state of (small) cell by giving a higher priority to the existing restricted measurement.

The above-described method may be used in the restricted RRM measurement operation and enhanced restricted RRM measurement operation in the same manner. Namely, when the subframe pattern for enhanced restricted RRM measurement and the cell list to which the corresponding subframe pattern is applied are provided to the UE, if the cell to which "measSubframePatternNeigh" is applied and the cell to which the subframe pattern for enhanced restricted RRM measurement is applied are overlapped, the above same method may be applied.

Namely, the UE may disregard the subframe pattern for enhanced restricted RRM measurement and may not perform enhanced restricted RRM measurement for the corresponding overlapped cell. In other words, the UE may give a higher priority to the existing CRS-based restricted RRM measurement operation in the corresponding overlapped cell and may perform only CRS-based restricted RRM measurement in the subframe indicated in "measSubframePatternNeigh".

Further, as another example, when the cell to which the subframe pattern for the existing restricted RRM measurement (M1) is applied, the cell to which the subframe pattern for DRS-based restricted RRM measurement (M2) is applied, and the cell to which the subframe pattern for the enhanced restricted RRM measurement (M3) is applied are overlapped, the UE gives the highest priority to M1, then gives the second highest priority to M2, then gives the lowest priority to M3. Namely, when the cell to which M1 is applied overlaps with the cell to which M2 and/or M3 are applied, the UE may perform only M1 for the overlapped cell. Further, when the cell to which M2 is applied overlaps with the cell to which M3 is applied, the UE may perform only M2 for the redundant cell.

3) As another embodiment of the present invention, it is defined or configured in the UE that CRS-based restricted measurement is to be performed for only the subframes which are intersection of sets of subframes indicated in "measSubframePatternNeigh" and subframes of the DMTC duration (or DRS occasion). Namely, only the CRS-based restricted measurement is performed, and the CRS-based restricted measurement can be performed for only the subframes indicated in "measSubframePatternNeigh" within DMTC duration.

The above-described method may be used in the existing restricted RRM measurement operation and enhanced restricted RRM measurement operation in the same manner. Namely, when the subframe pattern for enhanced restricted RRM measurement and the cell list to which the corresponding subframe pattern is applied are provided to the UE, if the cell to which "measSubframePatternNeigh" is applied and the cell to which the subframe pattern for enhanced restricted RRM measurement is applied are overlapped, the above same method may be applied.

Namely, restricted RRM measurement may be performed based on the existing reference signal (e.g., a CRS) for only the enhanced, restricted RRM measurement subframe pattern (or enhanced restricted RRM measurement duration) and subframes in which "measSubframePatternNeigh" is redundant.

4) As another embodiment of the present invention, it is defined or configured in the UE that CRS-based restricted measurement is to be performed for only the subframes which are intersection of sets of subframes indicated in "measSubframePatternNeighDRS" and subframes of the DMTC duration (or DRS occasion) by handling the cell-ID A as DRS in the DMTC duration (or DRS occasion). Further, the cell-ID A is regarded as the legacy CRS except for the DMTC duration (or DRS occasion) so that it is defined or configured in the UE that the CRS-based restricted measurement is performed for the subframes indicated in "measSubframePatternNeigh".

The above-described method may be used in the existing restricted RRM measurement operation and enhanced restricted RRM measurement operation in the same manner. Namely, when the subframe pattern for enhanced restricted RRM measurement and the cell list to which the corresponding subframe pattern is applied are provided to the UE, if the cell to which "measSubframePatternNeigh" is applied and the cell to which the subframe pattern for enhanced restricted RRM measurement is applied are overlapped, the above same method may be applied.

Namely, it is defined or configured in the UE that CRS-based restricted measurement is to be performed for only the subframes which are intersection of sets of the duration to which enhanced restricted RRM measurement is applied and the enhanced restricted RRM measurement subframe pattern in the duration. Further, it may be defined or set in the UE that CRS-based restricted measurement is to be performed for subframes indicated in "measSubframePatternNeigh" except for the corresponding duration.

5) As another embodiment of the present invention, the assumption that the UE does not expect the case of overlap like specific cell-ID A may be defined. Namely, when a case that a specific cell-ID is overlapped occurs, it is possible that it is regarded as an error case so that the UE disregards the DRS-based restricted measurement configuration (or CRS-based restricted measurement configuration). Further, in this case, the operation of the UE becomes unspecified, and thus the UE does not responsibility for the operation of the UE.

Further, as strict network restriction is defined, the restriction that the network cannot provide the configuration in the case of overlap like the cell-ID A to the UE may be defined or set in the UE.

The above-described method may be used in the existing restricted RRM measurement operation and enhanced restricted RRM measurement operation in the same manner. Namely, when the subframe pattern for enhanced restricted RRM measurement and the cell list to which the corresponding subframe pattern is applied are provided to the UE, if the cell to which "measSubframePatternNeigh" is applied and the cell to which the subframe pattern for enhanced restricted RRM measurement is applied are overlapped, the above same method may be applied.

Namely, as the overlapped cell is regarded as an error case, the UE may be defined to disregard one of the existing restricted RRM measurement and the enhanced restricted RRM measurement.

Further, the restriction that the configuration in the case of the overlap like cell-ID in the network cannot be provided to the UE may be defined or configured in the UE.

Likewise, when the DMTC duration (or DRS occasion) is configured and the restricted RRM measurement configuration is directed in the UE, it should be clarified whether the restricted measurement in the DRS is also applied. As such, the operation of the UE for the restricted RRM measurement may be more clearly configured through the method proposed in the present invention.

General Apparatus to which the Present Invention may be Applied

FIG. 24 illustrates a block diagram of a wireless communication apparatus according to an embodiment of the present invention.

Referring to FIG. 24, the wireless communication system includes a base station (eNB) 2410 and a plurality of user equipments (UEs) 2420 located within the region of the eNB 2410.

The eNB 2410 includes a processor 2411, a memory 2412 and a radio frequency unit 2413. The processor 2411 implements the functions, processes and/or methods proposed in FIGS. 1 to 23 above. The layers of wireless interface protocol may be implemented by the processor 2411. The memory 2412 is connected to the processor 2411, and stores various types of information for driving the processor 2411. The RF unit 2413 is connected to the processor 2411, and transmits and/or receives radio signals.

The UE 2420 includes a processor 2421, a memory 2422 and a radio frequency unit 2423. The processor 2421 implements the functions, processes and/or methods proposed in FIGS. 1 to 23 above. The layers of wireless interface protocol may be implemented by the processor 2421. The memory 2422 is connected to the processor 2421, and stores various types of information for driving the processor 2421. The RF unit 2423 is connected to the processor 2421, and transmits and/or receives radio signals.

The memories 2412 and 2422 may be located interior or exterior of the processors 2411 and 2421, and may be connected to the processors 2411 and 2421 with well known means. In addition, the eNB 2410 and/or the UE 2420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for performing a measurement based on the discovery signal in a wireless communication system of the present disclosure has been described mainly with the example applied to 3GPP LTE/LTE-A system, but may also be applied to various wireless communication systems except the 3GPP LTE/LTE-A system.

What is claimed is:

1. A method of performing a measurement in a wireless communication system, the method performed by a user equipment (UE) and comprising:
receiving, from a base station (BS), a cell-specific reference signal (CRS) configuration including information related to whether or not two antenna ports are used for a CRS;
receiving, from the BS, a discovery signal received via a number of antenna ports, the number of antenna ports used for receiving the discovery signal derived from the information included in the CRS configuration; and
measuring at least a reference signal receive power (RSRP) or a reference signal received quality (RSRQ) based on the discovery signal,
wherein, when the information included in the CRS configuration informs that the two antenna ports are used for the CRS, the discovery signal comprises a CRS for discovery on the two antenna ports.

2. The method of claim 1, further comprising:
receiving, from the BS:
a first subframe pattern for a CRS-based measurement, and
first cell information for at least one cell to which the first subframe pattern is applied; and
receiving, from the BS, a second subframe pattern for a DRS-based restricted measurement within a discovery signal measurement timing configuration (DMTC) duration and second cell information for at least one cell to which the second subframe pattern is applied.

3. The method of claim 2, wherein the measurement is performed in a subframe indicated by the received first subframe pattern within the DMTC duration for monitoring the discovery signal.

4. The method of claim 3, wherein the measurement is performed in a subframe indicated by the second subframe pattern.

5. The method of claim 3, wherein only a restricted measurement based on the received discovery signal or a restricted measurement based on the CRS is performed for an overlapped cell when a cell belonging to the received first cell information and a cell belonging to the received second cell information are overlapped.

6. The method of claim 3, wherein the CRS-based restricted measurement is performed for an overlapped cell in a subframe indicated by the received first subframe pattern when a cell belonging to the received first cell information and a cell belonging to the received second cell information are overlapped.

7. The method of claim 3, wherein a restricted measurement based on the received discovery signal is performed for an overlapped cell in a subframe indicated by the received second subframe pattern and the CRS-based restricted measurement is performed in a subframe indicated by the received first subframe pattern in a duration other than the DMTC duration when a cell belonging to the received first cell information and a cell belonging to the received second cell information are overlapped.

8. The method of claim 1, wherein the measurement is performed assuming that the two antenna ports are used for the discovery signal when the CRS configuration indicates that two antenna ports are used for the CRS.

9. The method of claim 1, wherein the measurement is performed assuming that only one of the two antenna ports is used for the discovery signal when the CRS configuration indicates that one antenna port is used for the CRS.

10. The method of claim 1, wherein a Radio Resource Control (RRC) parameter PresenceAntennaPort1 is used for the received CRS configuration.

11. A user equipment (UE) for performing measurement in a wireless communication system, the UE comprising:
a radio frequency (RF) unit configured to transmit and receive a wireless signal; and
a processor configured to:
control the RF unit to receive, from a base station (BS), a cell-specific reference signal (CRS) configuration including information related to whether two antenna ports are used for a CRS;
control the RF unit to receive the discovery signal from the BS via a number of antenna ports, the number of antenna ports used for receiving the discovery signal derived from the information included in the CRS configuration; and measure at least a reference signal receive power (RSRP) or a reference signal received quality (RSRQ) based on the discovery signal, wherein, when the information included in the CRS configuration informs that the two antenna ports are used for the CRS, the discovery signal comprises a CRS for discovery on the two antenna ports.

12. The UE of claim 11, wherein the measurement is performed assuming that the two antenna ports are used for the discovery signal when the CRS configuration indicates that two antenna ports are used for the CRS.

13. The UE of claim 11, wherein the measurement is performed assuming that only one of the two antenna ports is used for the discovery signal when the CRS configuration indicates that one antenna port is used for the CRS.

14. The UE of claim 11, wherein a Radio Resource Control (RRC) parameter PresenceAntennaPort1 is used for the received CRS configuration.

* * * * *